United States Patent
Couture

(10) Patent No.: US 7,617,561 B2
(45) Date of Patent: Nov. 17, 2009

(54) APPARATUS FOR CLEARING SNOW FROM THE ROOF OF A VEHICLE

(75) Inventor: Michel Couture, St-Ephrem-de-Beauce (CA)

(73) Assignee: 6954901 Canada Inc., Saint-Jean-sur Richelieu, Quebec (CA)

( * ) Notice: Subject to any disclaimer, the term of this patent is extended or adjusted under 35 U.S.C. 154(b) by 38 days.

(21) Appl. No.: 11/657,528

(22) Filed: Jan. 25, 2007

(65) Prior Publication Data
US 2008/0178411 A1   Jul. 31, 2008

(51) Int. Cl.
*E01H 5/06* (2006.01)
(52) U.S. Cl. .......................... 15/306.1; 15/308; 15/309; 15/DIG. 2; 37/222; 37/223; 37/249; 37/252; 37/255
(58) Field of Classification Search ............... 37/222, 37/223, 250, 255, 257, 258, 268, 273, 244, 37/249, 252; 15/DIG. 2, 306.1, 308, 309; *E01H 5/06*
See application file for complete search history.

(56) References Cited

U.S. PATENT DOCUMENTS

| | | | | |
|---|---|---|---|---|
| 3,276,571 | A | * | 10/1966 | Vohl ............................ 198/676 |
| 4,325,195 | A | * | 4/1982 | Comer .......................... 37/227 |
| 4,443,958 | A | * | 4/1984 | Huotari ....................... 37/238 |
| 5,989,356 | A | | 11/1999 | Candeletti |
| 6,453,500 | B1 | | 9/2002 | Schmitt |

* cited by examiner

Primary Examiner—David A Redding
(74) Attorney, Agent, or Firm—Fasken Martineau DuMoulin LLP

(57) ABSTRACT

The present invention relates generally to the field of vehicle snow clearing systems and more specifically, to an apparatus for clearing snow and ice from the roof or top surface of a commercial vehicle such as, a tractor trailer. The apparatus includes at least one upright member with a longitudinal axis and a lifting carriage assembly coupled to the at least one upright member for movement along the longitudinal axis thereof. A carriage driving assembly is operatively connected to the lifting carriage assembly and the lifting frame for selectively moving the lifting carriage assembly along the longitudinal axis of the at least one upright member. Also provided is a snow clearing assembly carried by the lifting carriage assembly and positionable on the roof or top surface of the vehicle. The snow clearing assembly includes a housing, blower means disposed at least partially within the housing for casting snow from the roof of the vehicle and a pair of first and second, spaced apart, auger members rotatably mounted within the housing for directing snow on the roof of the vehicle toward the blower means. The first auger member is disposed frontward of the second auger member. The lowest extremity of the first auger member is spaced away from the roof or top surface of the vehicle, when the snow clearing assembly is positioned onto the roof or top surface of the vehicle. At least one portion of the second auger member is constructed of a resilient material so as to allow the at least one portion of the second auger member to flex when borne against the roof during actuation of the snow clearing assembly.

52 Claims, 29 Drawing Sheets

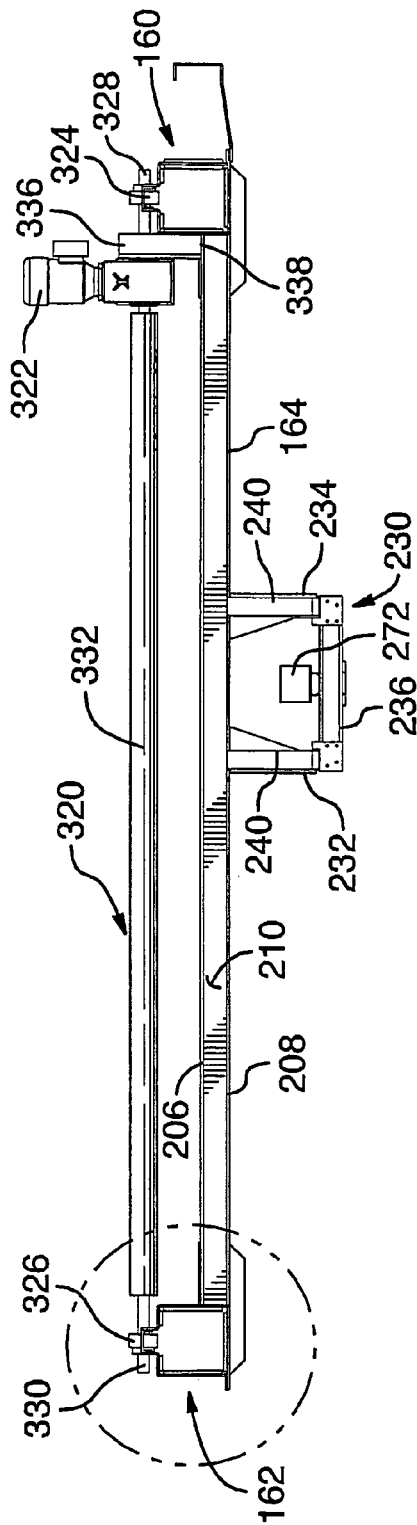
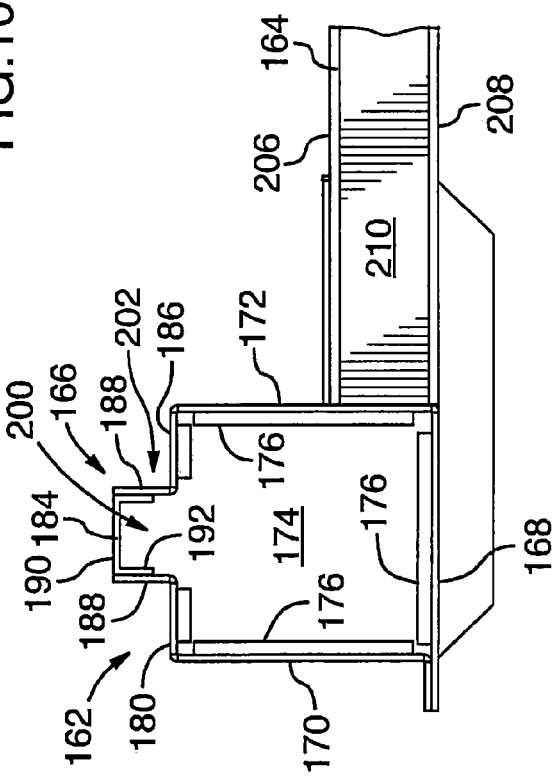
FIG.10A
FIG.10B

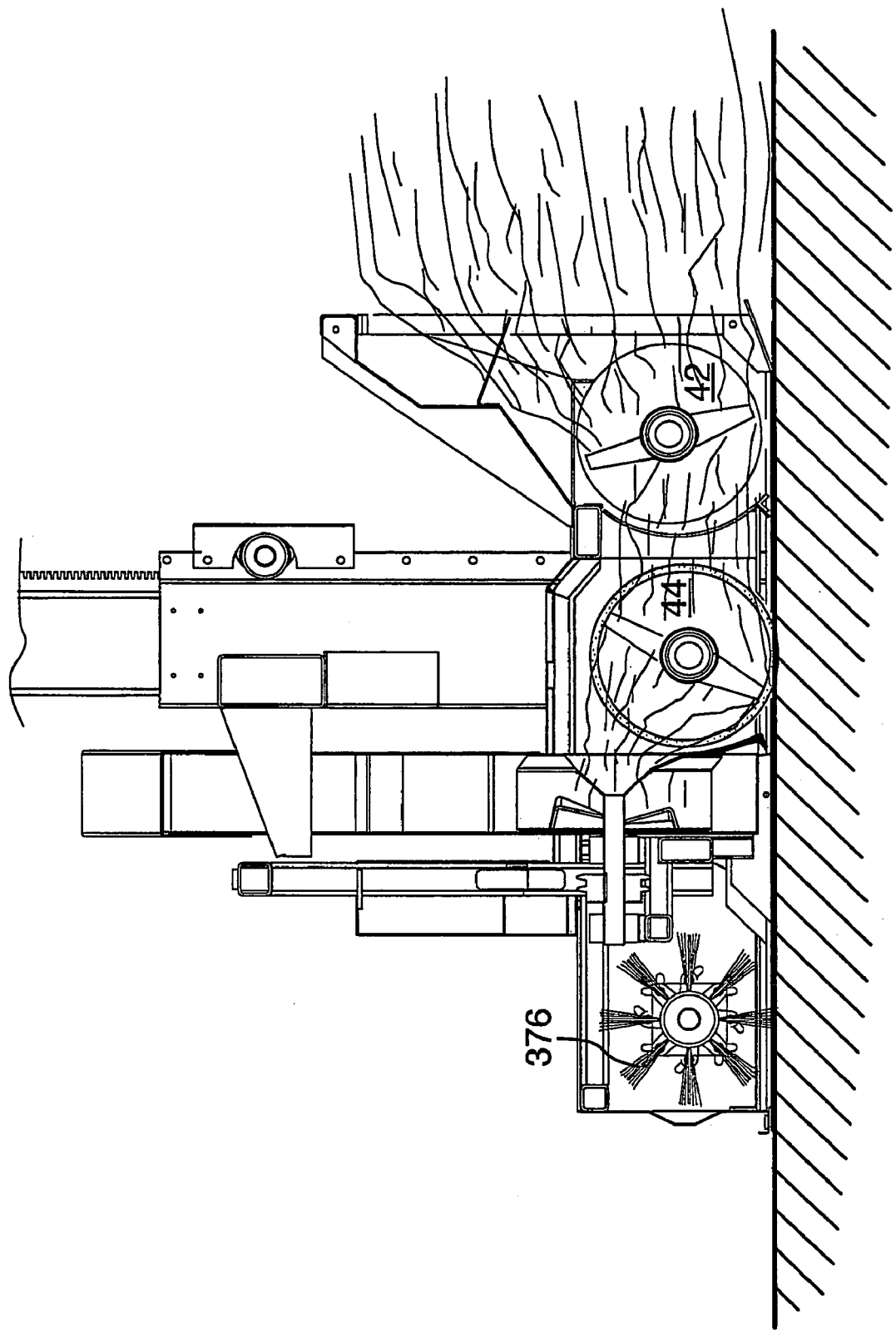

APPARATUS FOR CLEARING SNOW FROM THE ROOF OF A VEHICLE

FIELD OF THE INVENTION

The present invention relates generally to the field of vehicle snow clearing devices and more specifically, to an apparatus for clearing snow and ice from the roof or top surface of a commercial vehicle such as, a tractor trailer.

BACKGROUND OF THE INVENTION

The accumulation of snow and ice on the roofs and other surfaces of motor vehicles poses a serious hazard for drivers on the road. Blowing snow from the roofs of these motor vehicles can severely reduce visibility thereby increasing the risks of accidents. This problem is of particular concern for the drivers and/or owners/operators of commercial vehicles such as tractor trailers, as the trailer portion of these vehicles tends to present a large surface area upon which snow may accumulate, forming snow mounds, which in some cases may be several inches thick. Moreover, some jurisdictions have passed legislation making it illegal for the driver or owner/operator of a vehicle to allow snow or ice to fall from the vehicle on a public highway. As will be appreciated, the effect of this legislation has been to impose on these persons a legal obligation to clear snow from the roofs of their tractor trailers. In some cases, to comply with this legal requirement, drivers or employees have climbed atop the roofs of the tractor trailers and manually cleared them of snow and ice. The task can be physically demanding and time-consuming, and can present a significant safety hazard to the driver/employee as the roof is often very slippery. Additionally, the snow clearing operation may often be performed in less than ideal conditions (i.e. under the cover of darkness, in extremely cold temperatures and/or during a snowfall or winter storm).

Several attempts have been made in the past to facilitate the removal of snow and ice from the roofs of motor vehicles. One such example is described in U.S. Pat. No. 5,989,356 issued to Candeletti. This patent relates to a snow scraping apparatus that includes a scraping assembly and a supporting assembly for holding the scraping assembly in a desired position. The scraping assembly has a scraping member that is oriented horizontally or parallel to the motor vehicle surface from which the accumulation of snow is to be removed. The scraping member is carried at height substantially the same or slightly higher than the roof of the motor vehicle such that when the motor vehicle passes beneath the scraping assembly, the scraping member contacts the roof of the motor vehicle and removes the snow from the roof. Additionally, the scraping assembly is provided with an elongate blade member that extends below the scraping member. The blade member is made of a yielding material sufficiently pliable to avoid damaging the roof surface when sliding contact is made therewith. In the preferred embodiment, the supporting assembly is in the form of a pair of upright members between which is mounted the scraping assembly. A height adjustment assembly is further provided to raise or lower the scraping assembly to a desired position to accommodate the height of the motor vehicle roof. In another embodiment, the supporting assembly has only one upright frame member to which is mounted an arm member in cantilevered fashion. Carried from the arm member is a resilient blade member. Also provided, is a rotatable brush member in the form of an auger brush that is mounted slightly above the arm and the blade member. A curved steel blade is placed adjacent the rear of the auger brush and serves to cast snow away from the roof when the auger brush is rotated.

While the scraping apparatus of Candeletti may be appropriate to clear snow from the roof of small motor vehicles (i.e. cars) it tends not be suitable for heavy-duty applications such as for the removal of accumulations of snow and ice from the roof surface of a tractor trailer. In particular, the scraping and blade members of the Candeletti apparatus would tend to be insufficiently robust and incapable of breaking thick layers of snow and ice on the roof of the tractor trailer.

Another approach to clearing snow from motor vehicle roofs was taken in U.S. Pat. No. 6,453,500 issued to Schmitt. This patent describes a vehicle snow removal system that includes a main frame and a snow blower assembly coupled to the main frame and lowerable therefrom onto the roof of the vehicle. The main frame has a rotatable auger for scraping snow from the roof of a vehicle passing through the main frame. The auger is contained within a blower housing. A squeegee assembly having a squeegee blade is mounted to the underside of the snow blower assembly. When the snow blower assembly is lowered onto the roof, the squeegee blade contacts the roof and prevents the snow blower assembly from damaging the roof of the commercial vehicle as well as squeegeeing any watery snow or ice off the roof A directional chute is coupled to the blower housing for directing the snow displaced by the auger into a holding bin.

While the vehicle roof snow removal system of Schmitt tends to be better suited for removing snow and ice from the roofs of commercial vehicles and constitutes an advancement over the device of Candeletti by virtue of its more robust and durable construction, it tends to suffer from several drawbacks. In some cases where the vehicle roofs had large accumulations of snow and ice, the squeegee blade would tend not to be effective in clearing the roof of these accumulations in a single pass of the vehicle through the main frame. In those circumstances, multiple passes would likely be required which would tend to be time-consuming.

In light of the foregoing, it would be advantageous to have an apparatus for clearing snow from the roof of commercial vehicles that is well adapted for heavy-duty use and that is capable of removing relatively large snow and ice accumulations rapidly and efficiently while obviating the disadvantages associated with the prior art devices and preventing damage to the roof of the commercial vehicles.

SUMMARY OF THE INVENTION

According to a broad aspect of an embodiment of the present invention, there is provided an apparatus for clearing snow from the roof of a vehicle. The apparatus includes at least one upright member having a longitudinal axis and a lifting carriage assembly coupled to the at least one upright member for movement along the longitudinal axis thereof. The apparatus further includes a snow clearing assembly carried by the lifting carriage assembly and positionable on the roof of the vehicle. The snow clearing assembly includes a housing, blower means disposed at least partially within the housing for casting snow from the roof of the vehicle and a pair of first and second, spaced apart, auger members. The auger members are rotatably mounted within the housing for directing snow on the roof of the vehicle toward the blower means. The first auger member is disposed frontward of the second auger member with its lowest extremity being spaced away from the roof when the snow clearing assembly is positioned onto the roof of the vehicle. At least one portion of the second auger member is constructed of a resilient material so as to allow the at least one portion of the second auger member to flex when borne against the roof during actuation of the snow clearing assembly.

In an additional feature, the at least one upright member includes a pair of spaced apart first and second upright members. The spacing between the first and second upright members is sized so as to accommodate the passage of a vehicle therebetween. Each upright member has a mast portion and a pair of spaced apart, first and second feet connected to the mast portion for abutting a support surface. The spacing between the first and second feet of each upright member is adjustable.

In a further feature, each mast portion has a top end, a bottom end and first and second opposed hollow mounting arms. The hollow mounting arms are carried on the bottom end of the mast portion and extend away from each other generally transversely of the mast portion. Further, each foot has a portion configured for mating with one of the hollow mounting arms, the mating portion of each foot being telescopically mounted to one of the hollow mounting arms.

In an additional feature, the apparatus further comprises a carriage driving assembly and a controller. The carriage driving assembly is operatively connected to the lifting carriage assembly for selectively moving the lifting carriage assembly along the longitudinal axes of the upright members. The controller governs actuation of the carriage driving assembly and snow clearing assembly.

In another feature, the lifting carriage assembly is mounted to extend between the first and second upright members and includes first and second carriage portions. Each carriage portion is mounted onto one of the first and second upright members for longitudinal movement therealong. In yet another feature, each carriage portion is mounted in surrounding relation to one of the first and second upright members.

In a further feature, the lifting carriage assembly further includes a cross-member. The cross-member has a first end attached to the first carriage portion and a second end attached to the second carriage portion.

In an additional feature, the snow clearing assembly is detachably mounted to the lifting carriage assembly. The cross-member of the lifting carriage assembly has a cradle member attached thereto intermediate the first and second ends thereof for holding the snow clearing assembly suspended between the first and second upright members. In another feature, the housing has a suspension arm attached thereto. The suspension arm is engageable within the cradle member to allow suspension of the snow clearing assembly from the cradle member.

In yet another feature, the apparatus further has sensing means associated with the cradle member for detecting the position of the suspension arm within the cradle. The sensing means includes a first sensor and a second sensor. The first sensor is operable to detect the suspension arm in a first lower position within the cradle member while the second sensor operable to detect the suspension arm in a second upper position within the cradle member. In an additional feature, the controller is operable to disable the carriage drive assembly when the second sensor detects the suspension arm in the second upper position.

In yet an additional feature, the apparatus further includes an upper displacement limit switch associated with one of the carriage portions and one of the upright members for detecting when the lifting carriage assembly has reached a first upper limit position on one of the upright members. Also provided is, a lower displacement limit switch associated with one of the carriage portions and one of the upright members for detecting when the lifting carriage assembly has reached a second lower limit position on one of the upright members. The controller is operable to disable the carriage drive assembly when the lifting carriage assembly has reached one of the upper and lower limit positions.

In another feature, the apparatus further includes means for constraining movement of the snow clearing assembly relative to the lifting carriage assembly. In yet another feature, the constraining means includes first and second guide plates mounted to the housing. The first guide plate is engageable with the first carriage portion and the second guide plate is engageable with the second carriage portion.

In a further feature, the housing has a front end, a rear end, and a pair of spaced apart, first and second sidewalls. The first and second side walls extend between the front and rear ends of the housing. The first guide plate is mounted to the first sidewall of the housing for bearing against a face of first carriage portion. The second guide plate is mounted to the second sidewall of the housing for bearing against a face of the second carriage portion.

In an additional feature, each upright member includes a front face, an opposed rear face and a pair of spaced apart side faces. One of the faces of the upright member carries thereon a longitudinally extending rack for engaging a portion of the carriage drive assembly.

In still another feature, the carriage drive assembly includes a drive shaft mounted for rotation between the first and second carriage portions. The drive shaft has a first end and a second end. In this feature, the carriage drive assembly also includes and a drive motor for driving rotation of the drive shaft, a first drive gear and a second drive gear. The first drive gear is attached to the drive shaft adjacent the first end thereof, is associated with the first carriage portion and is mounted for engagement with the rack of the first upright member. The second drive gear is attached to the drive shaft adjacent the second end thereof, the second drive gear being associated with the second carriage portion and being mounted for engagement with the rack of the second upright member.

In yet another feature, each carriage portion includes a front face, an opposed rear face and a pair of spaced apart side faces for placement opposite the front, rear and side faces, respectively, of each respective upright member. The faces of each carriage portion cooperate with each other to define an opening shaped to receive therethrough one of the first and second upright members, the face of each carriage portion disposed opposite each rack having a protruding portion for accommodating the rack. In a further feature, the front face of each carriage portion is disposed opposite each rack and the protruding portion in the front face of each carriage portion has a cutout defined therein to permit engagement of each respective drive gear to the rack of each respective upright member.

In additional feature, the apparatus further includes signaling means associated with the apparatus and disposed within view of a driver seated within the vehicle. In another feature, the signaling means includes a first set of signal lights disposed frontward of the upright members. In still another feature, the signaling means further includes a second set of signal lights disposed rearward of the upright members.

In a further feature, the apparatus further includes a vehicle position sensing means for detecting the position of the vehicle relative to the apparatus. The vehicle position sensing means includes a first optical sensor carried forward of the longitudinal axes of the upright members and a second optical sensor carried rearward of the longitudinal axes of the upright members.

In an additional feature, the apparatus further includes a carriage driving assembly operatively connected to the lifting carriage assembly for selectively moving the lifting carriage assembly along the longitudinal axes of the upright members. In this feature, the apparatus also includes an auger drive assembly for driving rotation of the first and second auger members, and a controller. The controller is operable to actuate the carriage drive assembly, the blower means and the auger drive assembly.

In still another feature, the snow clearing assembly is detachably mounted to the lifting carriage assembly.

In yet another feature, the housing has a front end, a rear end, and a pair of spaced apart, first and second sidewalls extending between the front and rear ends of the housing. The first and second auger members extend between the sidewalls of the housing and are mounted in tandem between the front and rear ends of the housing.

According to another broad aspect of an alternate embodiment of the present invention, there is provided an apparatus for clearing snow from a surface to be cleared the roof of a vehicle. The apparatus includes at least one upright member, the at least one upright member having a longitudinal axis and a lifting carriage assembly coupled to the at least one upright member for movement along the longitudinal axis thereof. The apparatus further includes a carriage driving assembly operatively connected to the lifting carriage assembly and the lifting frame for selectively moving the lifting carriage assembly along the longitudinal axis of the at least one upright member, and a snow clearing assembly. The snow clearing assembly is carried by the lifting carriage assembly and is positionable on the roof of the vehicle. The snow clearing assembly has a housing having a front end, a rear end, and a pair of spaced apart, first and second sidewalls extending between the front and rear ends of the housing. The snow clearing assembly further includes blower means disposed at least partially within the housing for casting snow from the roof of the vehicle and a pair of first and second, spaced apart, auger members. The auger members are rotatably mounted within the housing for directing snow on the roof of the vehicle toward the blower means, the first and second auger members extending between the sidewalls and mounted in tandem between the front and rear ends of the housing with the first auger member being disposed frontward of the second auger member. The lowest extremity of the first auger member is spaced away from the roof, when the snow clearing assembly is positioned onto the roof of the vehicle. At least one portion of the second auger member is constructed of a resilient material so as allow the at least one portion of the second auger member to flex when borne against the roof during actuation of the snow clearing assembly.

According to yet another broad aspect of a further alternate embodiment of the present invention, there is provided a snow clearing assembly positionable on the roof of a vehicle. The snow clearing assembly has a housing, blower means disposed at least partially within the housing for casting snow from the roof of the vehicle and a pair of first and second, spaced apart, auger members. Auger members are rotatably mounted within the housing for directing snow on the roof of the vehicle toward the blower means, the first auger member being disposed frontward of the second auger member. The lowest extremity of the first auger member is spaced away from the roof, when the snow clearing assembly is positioned onto the roof of the vehicle. At least one portion of the second auger member is constructed of a resilient material so as to allow the at least one portion of the second auger member to flex when borne against the roof during actuation of the snow clearing assembly.

In another feature, the apparatus further comprises an auger drive assembly operatively connected to the first and second auger members. The auger drive assembly includes an electric drive motor for driving rotation of the first and second auger members.

In a further feature, the roof of the vehicle has a width. Each auger member has a length and the length of each auger member is at least as great as the width of the roof.

In still a further feature, the first auger member is constructed of a rigid material.

In yet a further feature, at least one of the first and second auger members is a bidirectional auger member.

In an additional feature, the at least one bidirectional auger member includes a shaft having a first end, an opposed second end and first and second helical blade portions. The first helical blade portion extends inwardly from the first end with one of a right hand and left hand thread. The second helical blade portion extends inwardly from the second end with the other of a right hand and left hand thread. In another feature, the at least one bidirectional auger member has a central gap defined between the first and second helical blade portions. In the region of the gap, the shaft has radially extending therefrom at least one snow paddle. In still another feature, the at least one snow paddle includes a first snow paddle and a second snow paddle, the first snow paddle being circumferentially spaced from the second snow paddle by 180° degrees.

In an additional feature, the first auger member has a first axis of rotation and the second auger member has a second axis of rotation. The first axis of rotation is carried above the second axis of rotation.

In a further feature, the blower means includes a blower housing, an impeller disposed within the blower housing for drawing snow therein, a drive motor operatively connected to the impeller for driving rotation thereof and a discharge chute connected to the blower housing for ejecting snow away from the top surface of the vehicle.

In still a further feature, the apparatus further includes brush means carried on the snow clearing assembly. The brush means are disposed within the housing adjacent the rear end thereof and mounted for rotation between the first sidewall and the second sidewall of the housing. In still another feature, the blower means are disposed between the second auger member and the brush member.

In a further feature, the apparatus further includes an auger drive assembly operatively connected to the brush member and to each of the auger members for urging rotation thereof. The auger drive assembly is operable to rotate the first and second augers members in a first direction and the rotatable brush member in a second direction. The first direction is opposite the second direction.

In still an additional feature, the snow clearing assembly includes means mounted to the underside of the housing for abutting the top surface of the vehicle and for spacing the first auger member from the top surface, when the snow clearing assembly is positioned onto the top surface. The spacing means includes a pair of spaced apart, first and second rail members extending between the front and rear ends of the housing. The first rail member is disposed adjacent the first sidewall of the housing and the second track member is disposed adjacent the second sidewall thereof.

In a further feature, the housing has a front end, a rear end, and a pair of spaced apart, first and second sidewalls extending between the front and rear ends of the housing. The first and second auger members extend between the sidewalls of the housing and are mounted in tandem between the front and rear ends of the housing.

According to still another broad aspect of an embodiment of the present invention, there is provided a snow clearing assembly positionable on a surface to be cleared. The snow clearing assembly includes a housing having a front end, a rear end, and a pair of spaced apart, first and second sidewalls extending between the front and rear ends of the housing. The apparatus further has blower means disposed at least partially within the housing for casting snow from the surface to be cleaned and a pair of first and second, spaced apart, auger members. Auger members are rotatably mounted within the housing for directing snow on the surface to be cleaned toward the blower means. The first and second auger members extend between the sidewalls and are mounted in tandem between the front and rear ends of the housing with the first auger member being disposed frontward of the second auger member. The lowest extremity of the first auger member is spaced away from the surface to be cleaned, when the snow clearing assembly is positioned onto the surface to be cleaned. At least one portion of the second auger member is constructed of a resilient material so as to allow the at least one portion of the second auger member to flex when borne against the surface to be cleaned during actuation of the snow clearing assembly.

BRIEF DESCRIPTION OF THE DRAWINGS

The embodiments of the present invention shall be more clearly understood with reference to the following detailed description of the embodiments of the invention taken in conjunction with the accompanying drawings, in which:

FIG. 9b is an enlarged, isolated perspective view of the cradle member shown in FIG. 9a;

FIG. 10a is a top plan view of the lifting carriage assembly and the carriage drive assembly shown in FIG. 5;

FIG. 10b is an enlarged top plan view of the first carriage portion illustrated in FIG. 10a with the carriage drive assembly omitted for clarity.

FIG. 25b is a side elevation view of the vehicle and vehicle snow clearing apparatus shown in FIG. 25a;

FIG. 29 is a magnified cross-sectional view of the snow clearing assembly illustrated in FIG. 28 positioned on the roof of the vehicle.

DETAILED DESCRIPTION OF EMBODIMENTS OF THE INVENTION

Figure 1:
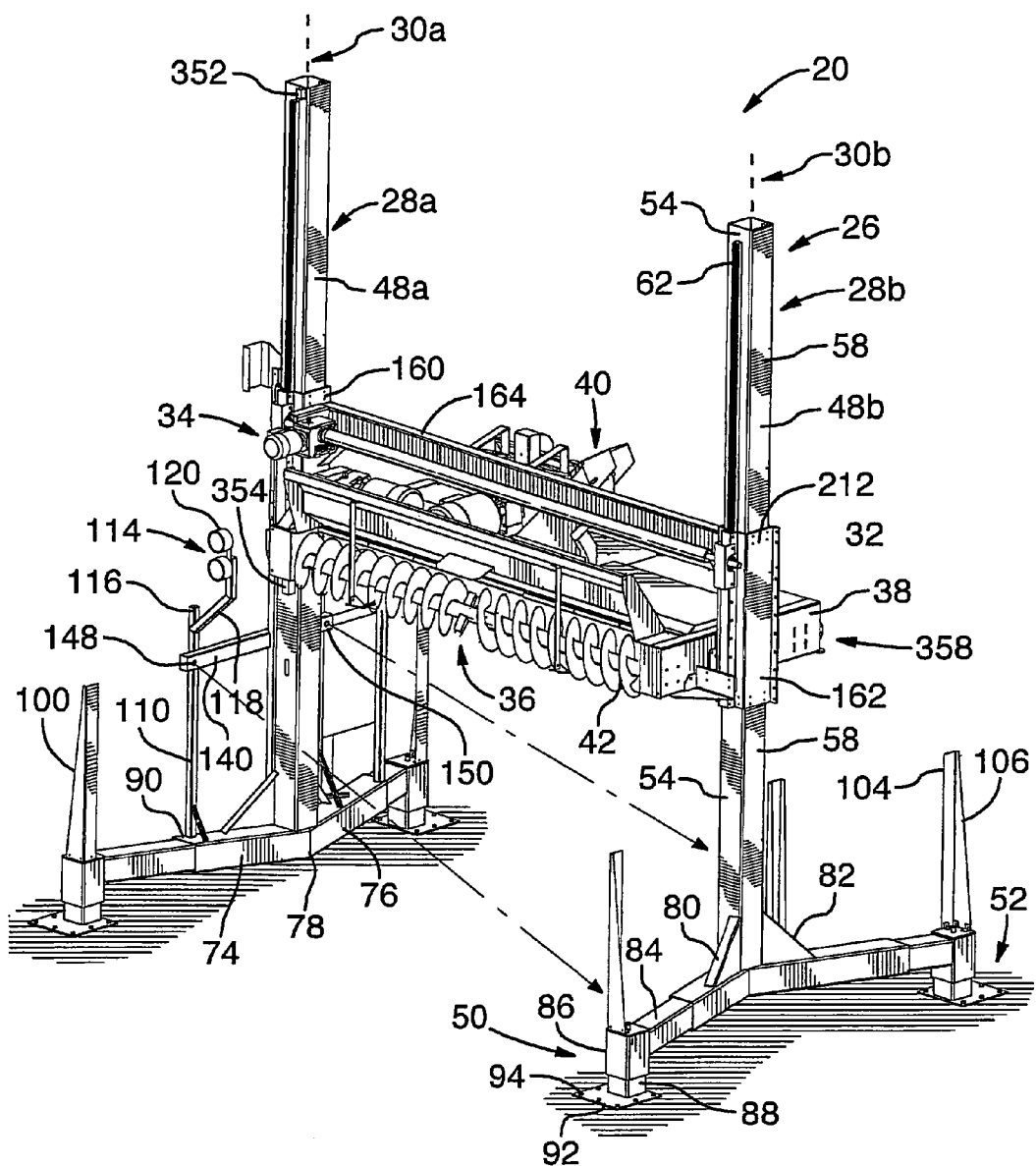
FIG. 1 is a front left perspective view of an apparatus for clearing snow from the roof or top surface of a vehicle in accordance with an embodiment of the invention.

The description, which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIGS. 1, 2, 3a and 20, there is shown a vehicle snow clearing apparatus designated generally with reference numeral 20. The apparatus 20 is designed to clear snow and/or ice 21 from the roof 22 or other top surface of a vehicle 24. Generally speaking, the vehicle snow clearing apparatus 20 includes: a lifting frame 26 having at least one upright member 28 with a longitudinal axis 30; a lifting carriage assembly 32 coupled to the at least one upright member 28 for movement along the longitudinal axis 30 thereof; a carriage driving assembly 34 operatively connected to the lifting carriage assembly 32 and the lifting frame 26 for selectively moving the lifting carriage assembly 32 along the longitudinal axis 30 of the at least one upright member 28; and a snow clearing assembly 36 carried by the lifting carriage assembly 32 and positionable on the roof 22 of the vehicle 24. The snow clearing assembly 36 includes a housing 38, blower means 40 disposed at least partially within the housing 38 for casting snow 21 from the roof 22 of the vehicle 24, and a pair of first and second, spaced apart, auger members 42 and 44 rotatably mounted within the housing 38 for directing snow 21 on the roof 22 of the vehicle 24 toward the blower means 40. The apparatus 20 is further provided with a controller 46 for governing actuation of the carriage drive assembly 34 and the snow clearing assembly 36.

In the preferred embodiment, the lifting frame 26 has a pair of spaced apart, first and second upright members 28a and 28b (identified generically with reference numeral 28) between which extends the lifting carriage assembly 32. The space S between the upright members 28a and 28b is sized to be greater than the width of the vehicle 24 so as to allow the vehicle 24 to pass between the upright members 28a and 28b during deployment of the vehicle snow clearing apparatus 20. In the present embodiment, the spacing between the upright members 28a and 28b measures 148.5 inches. Each upright member 28a, 28b has a mast portion 48a, 48b (identified generically with reference numeral 48) respectively, in the nature of a generally square hollow structural steel (HSS) section disposed along the respective longitudinal axis 30a, 30b (identified generically with reference numeral 30) of the upright member 28a, 28b and a pair of spaced apart, feet 50 and 52 for supporting each mast portion 48a, 48b. In alternative embodiments, the mast portion may have a different cross-section, for instance, circular or rectangular or further still, the mast portion may be H-shaped or T-shaped.

The mast portion 48 has a front face 54, an opposed rear face 56 and a pair of spaced apart side faces 58 and 60 which cooperate to define the generally square cross-section of the mast portion 48. In this embodiment, the mast portion 48 carries on its front face 54 a longitudinally extending rack member 62. The rack member 62 is configured with a plurality of protrusions in the nature of teeth 64 for engaging a portion of the carriage drive assembly 34. In other embodiments, the rack could be carried on one of the rear and side faces of the mast portion 48. Additionally, the rack could be could be constructed with ridges, ribs or other protruding formations instead of teeth.

The bottom end 72 of the mast portion 48a, 48b carries a pair of spaced apart, first and second, generally horizontally extending, hollow mounting arms 74 and 76 for connecting to feet 50 and 52, respectively. The hollow mounting arms 74 and 76 are welded to each other at their proximal ends 78 and mounted to extend transversely of the mast portion 48 in a generally diverging fashion. The weld connection between the bottom end 72 and each of the mounting arms 74, 76, is reinforced by a triangular gusset plate 80, 82 which is welded along one edge thereof to either the front face (in the case of the gusset plate 80) or rear face (in the case of the gusset plate 82) of the mast portion 48, and along another edge to the top face of the mounting arm 74, 76 (as the case may be).

Each foot 50, 52 has a generally horizontally extending arm portion 84 configured for mating with a respective hollow mounting arm 74, 76; a generally vertically extending, first leg portion 86 downwardly depending from, and welded to, the arm portion 84; and a second leg portion 88 connected to the first leg portion 86. Each arm portion 84 is telescopically mounted to the terminal end 90 of a respective hollow mounting arm 74, 76 so as to allow the spacing between the feet 50 and 52 to be adjusted (i.e. increased or decreased) to enhance stability and to suit the particular field conditions at the apparatus installation site. The first leg portion 86 is itself telescopically mounted to the second leg portion 88 to thereby permit the proper leveling of the lifting frame 26. Each first leg portion 86 may be fixed relative to each corresponding second leg portion 88 position using locking pins such that height of each first leg portion 86 could be individually adjusted. Alternatively, the feet 50 and 52 could be provided with self-leveling means in the nature of a hydraulic piston operatively connected to, and nested within, the first and second leg portions.

Welded to the lower end of the second leg portion 88, is a horizontal base plate 92 that abuts the support surface (not shown), for instance, the ground, pavement or a concrete footing (although, the latter is not required). The lifting frame 26 may be secured to the support surface by anchor bolts 94 which are received within apertures defined in the base plate 92. It will thus be appreciated that the vehicle snow clearing apparatus 20 does not require special site preparation for installation. Moreover, it need not be permanently installed at any given site. Rather, it has been designed for transport such that it may be relocated to a desired site using a crane or the like. However, in particular applications, it may be desirable to have a permanent installation of the vehicle snow clearing apparatus in which the case, the base portion of the lifting frame may be modified accordingly. For example, the mast portion may be anchored directly to a concrete footing.

Extending upwardly from each first leg portion 86 is a guard member 100. Each guard member 100 is an L-shaped angle member 102 welded at one end to the top face of the first leg portion 86. The angle member 102 is formed with a first angle leg 104 and a second angle leg 106. The first angle leg 104 is arranged such that its external face is oriented toward the opposing guard member 100, while the second angle leg 106 is disposed such that its external face is oriented away from its associated mast portion 48. The second angle leg 106 is trimmed on a slant to define an upwardly extending taper.

The four guard members 100—two front and two rear, right and left hand side guard members (best shown in FIG. 1)—serve a dual purpose. They protect the mast portions 48 from being accidentally damaged by a vehicle 24 approaching the apparatus 20 and provide a visual cue to the driver to assist him or her in properly positioning the vehicle 24 between the upright members 28a and 28b. To further enhance their marling and visibility functions, the guard members 100 may have reflective bands or tape affixed to the angle members 102.

Figure 2:
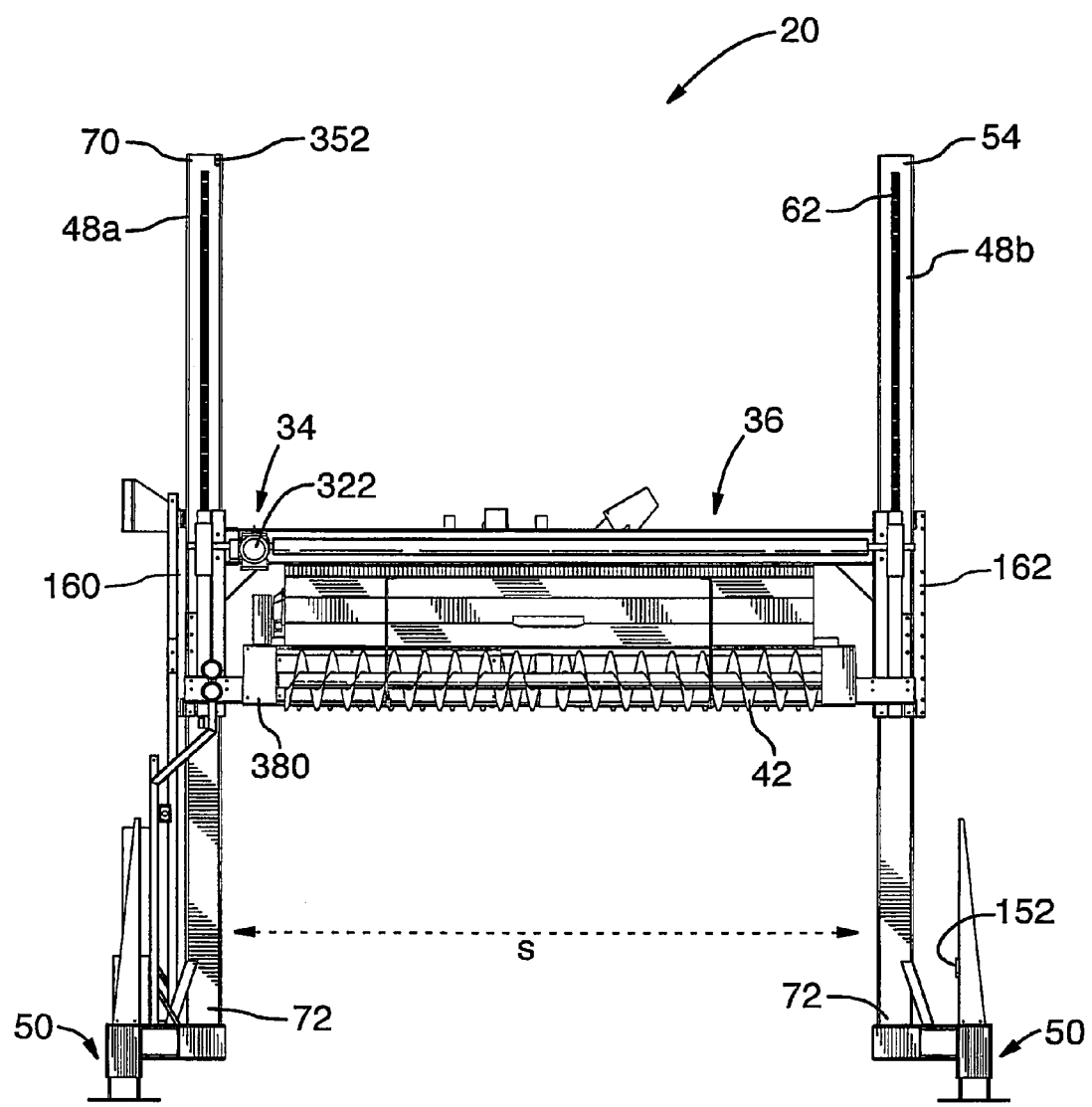
FIG. 2 is a front elevation view of the vehicle snow clearing apparatus shown in FIG. 1.
Figure 3A:
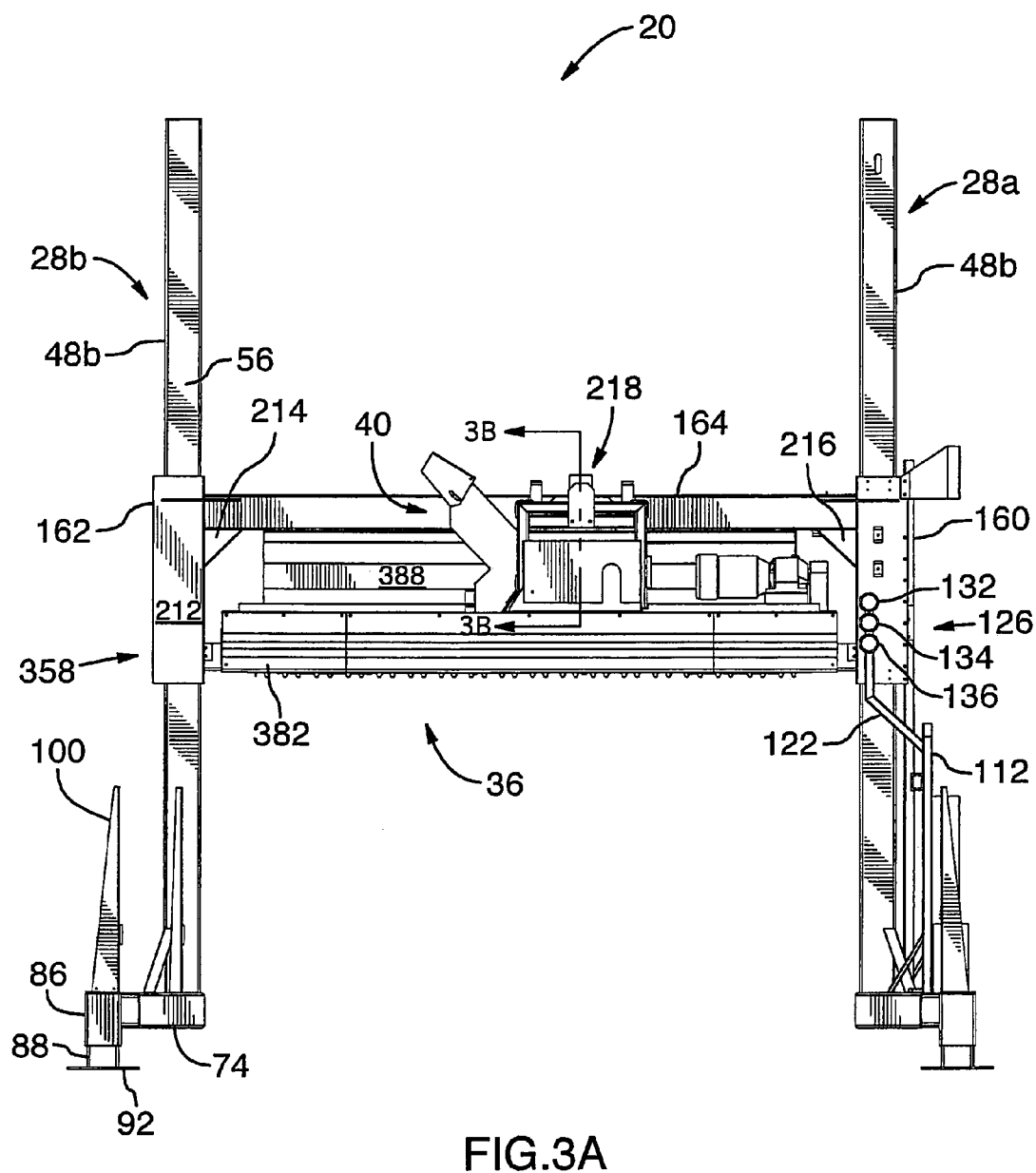
FIG. 3a is a rear elevation view of the vehicle snow clearing shown in FIG. 1.
Figure 6:
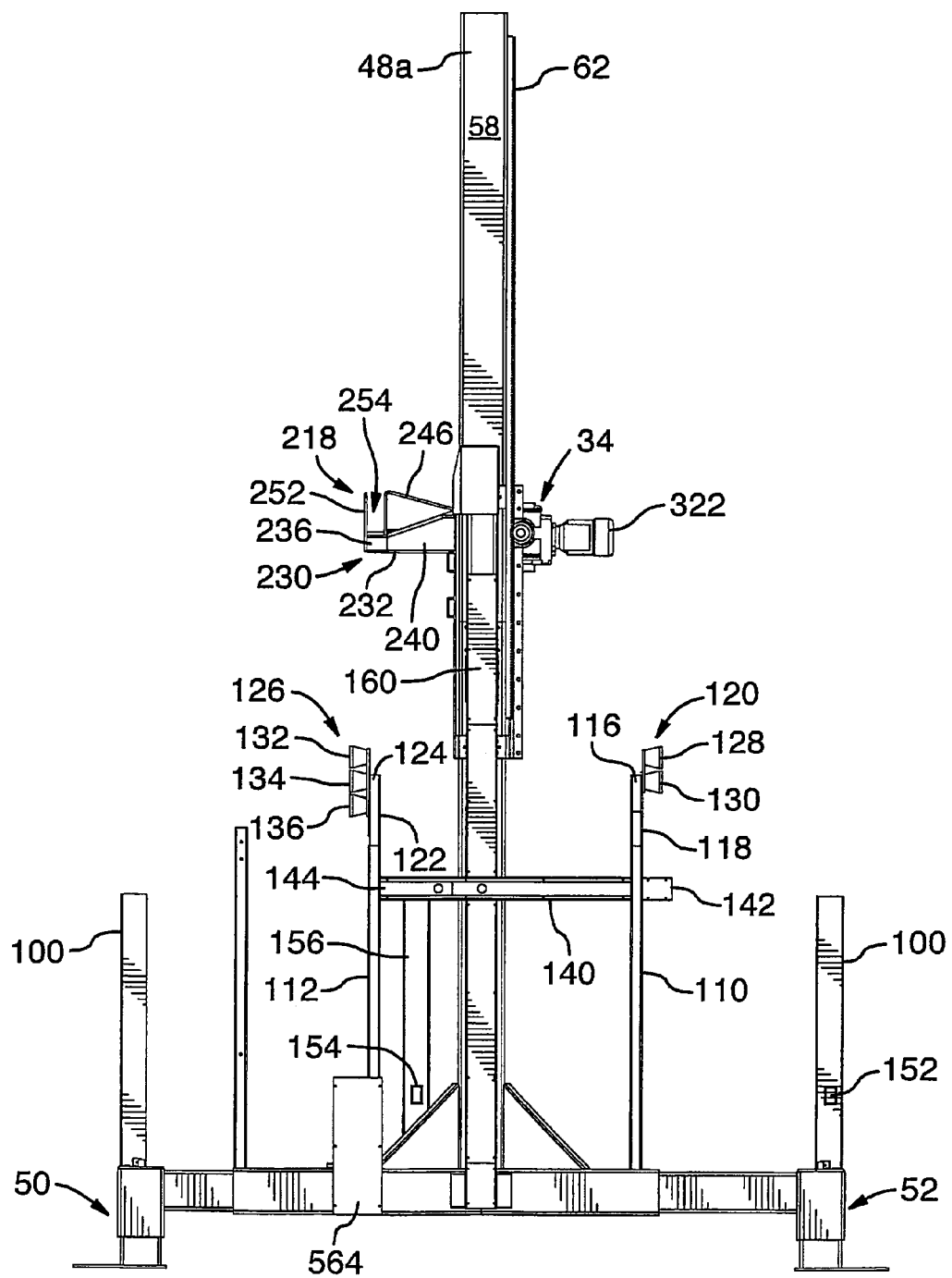
FIG. 6 is a left side elevation view of the vehicle snow clearing apparatus shown in FIG. 5.
Figure 7:
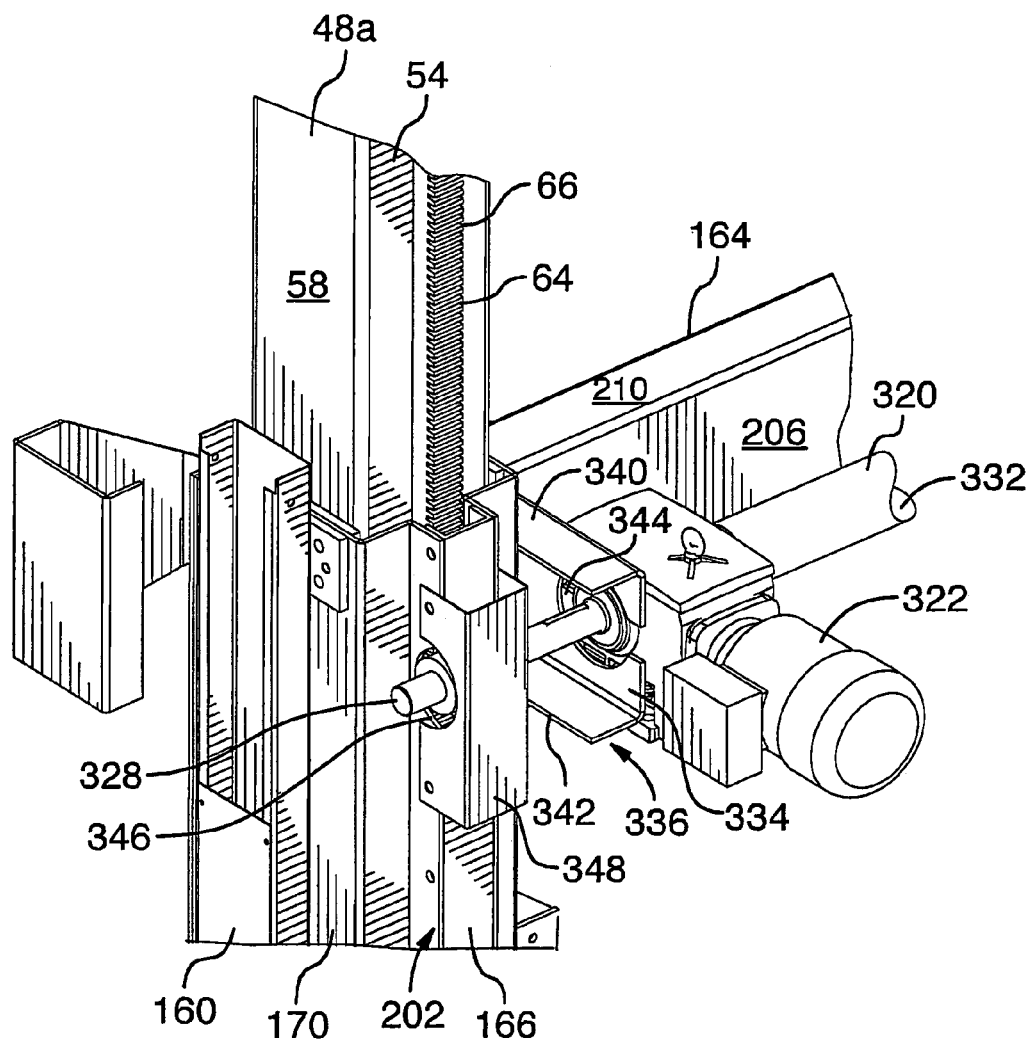
FIG. 7 is an enlarged, partial, front right perspective view of the vehicle snow clearing apparatus illustrated in FIG. 6 showing a portion of the carriage drive assembly and the first carriage portion of the lifting carriage assembly operatively mounted onto the mast portion of the first right member.
Figure 8:
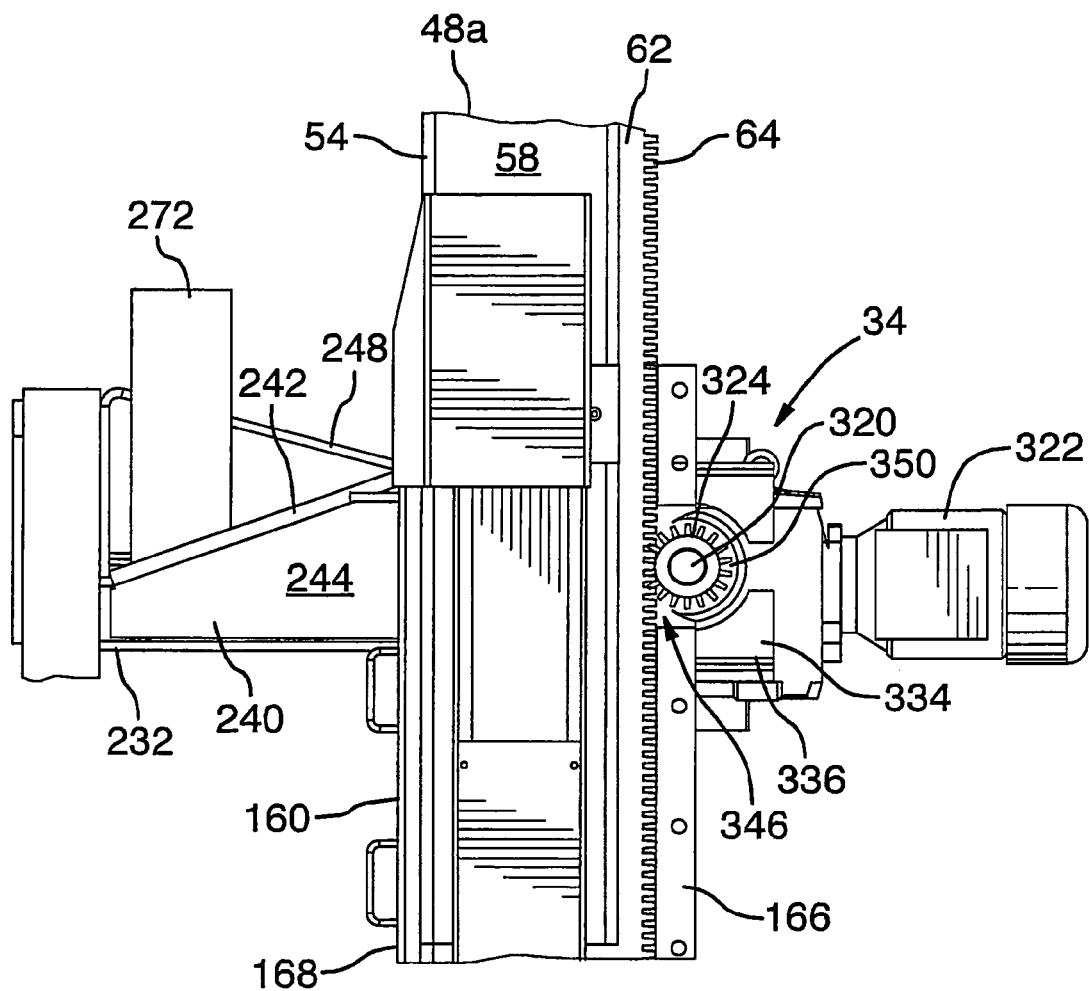
FIG. 8 is a left side elevation view of the vehicle snow clearing apparatus shown in FIG. 7 with a side plate of the first carriage portion removed to reveal a toothed rack member mounted on the front face of the first upright member, and with a cover plate also removed from the first carriage portion to reveal a toothed drive gear of the carriage drive assembly engaging the toothed rack member.

Referring to FIG. 6, the upright member 28a is provided with a pair of upwardly extending first and second vertical support member 110 and 112 for carrying signaling means 114 at a predetermined height above the support surface within view of a driver seated in his vehicle (either directly or through the vehicle's side view mirror). In this embodiment, the signaling means 114 is carried at a height between six and seven feet above the ground. The first vertical support member 110 is welded to the first mounting arm 74 adjacent the terminal end 90 thereof and carries, adjacent its upper end 116, a first dog-legged portion 118. Connected to the first dog-legged portion 118 is a first set 120 of signal lights (as shown in FIG. 2). In like fashion, the second support member 112 is mounted to the second mounting arm 76 and carries a second dog-legged portion 122 adjacent its upper end 124. A second set 126 of signal lights (as shown in FIG. 3a) is mounted onto the second dog-legged portion 122.

The first set 120 includes two signal lights—a red STOP signal light 128 and a green GO signal light 130 mounted below the STOP signal light 128. In contrast, the second set 126 has three light signals—a red STOP signal light 132, a yellow CAUTION signal light 134 and a green GO signal light 136, mounted one on top of the other. Alternate signal lights may be also be used to similar advantage, for instance, signal lights with wording or pictograms, or a combination of both. Additional modifications are possible. For instance, the second set of signal lights could be mounted at another location spaced away from the apparatus 20. In a further alternative, the second set of signal lights could be replaced with a display panel or the like. As will be explained in greater detail below, the first and second sets 120 and 126 of signal lights together define the signaling means 114 that is operable to guide the driver of the vehicle 24 into position between the upright members 28a and 28b and to notify or communicate to the driver the status of the apparatus during deployment.

Figure 4:
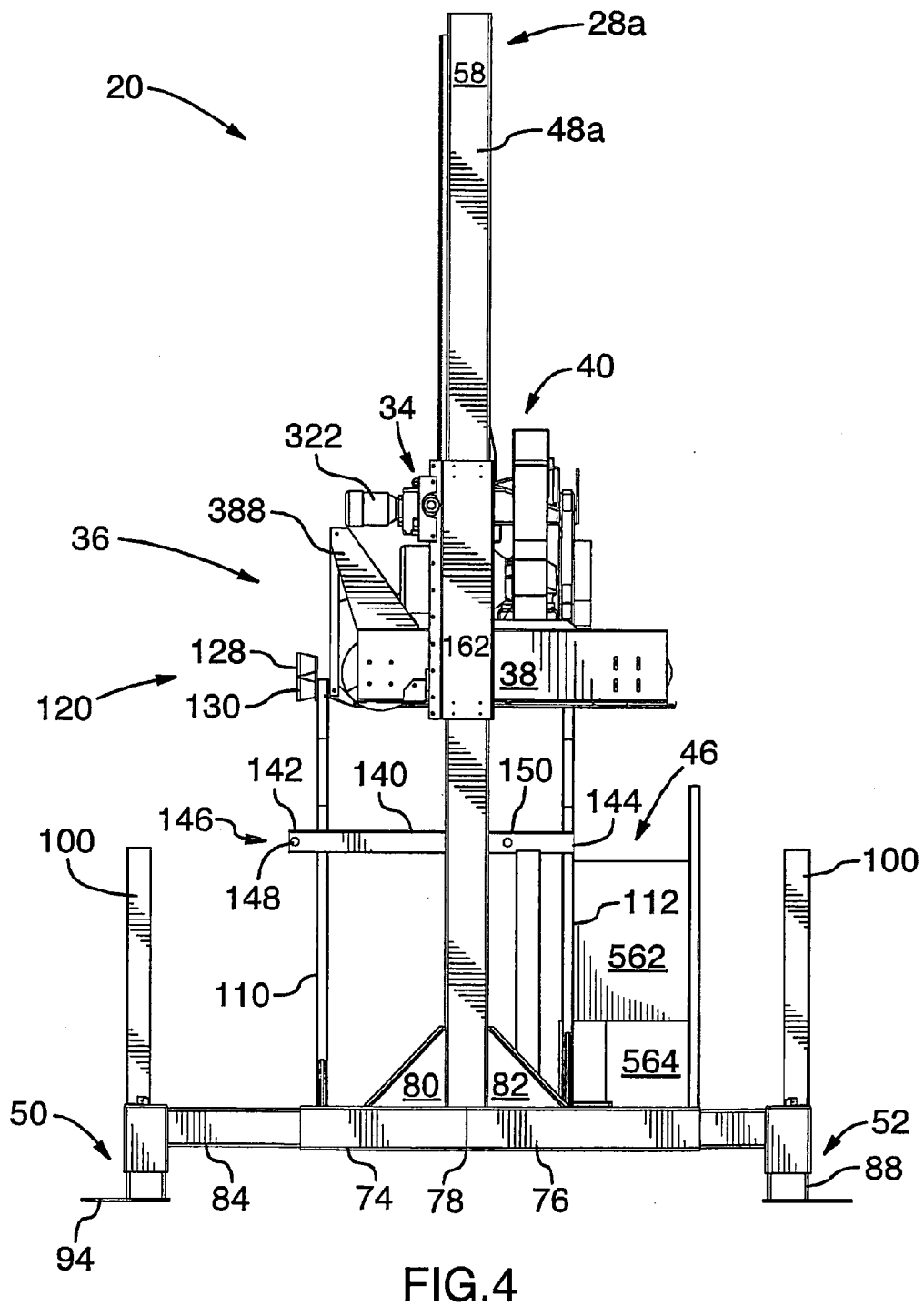
FIG. 4 is a right side elevation view of the vehicle snow clearing apparatus shown in FIG. 1.

As best shown in FIG. 4, a hollow cross-member 140 spans between, and is supported by, the first and second vertical support members 110 and 112 at a height above their respective midpoints and below their respective upper ends 116 and 124. The cross-member 140 has a front end 142 carried forwardly of the first vertical support member 110 in a cantilevered fashion, and a rear end 14 attached to the second vertical support member 112.

Figure 5:
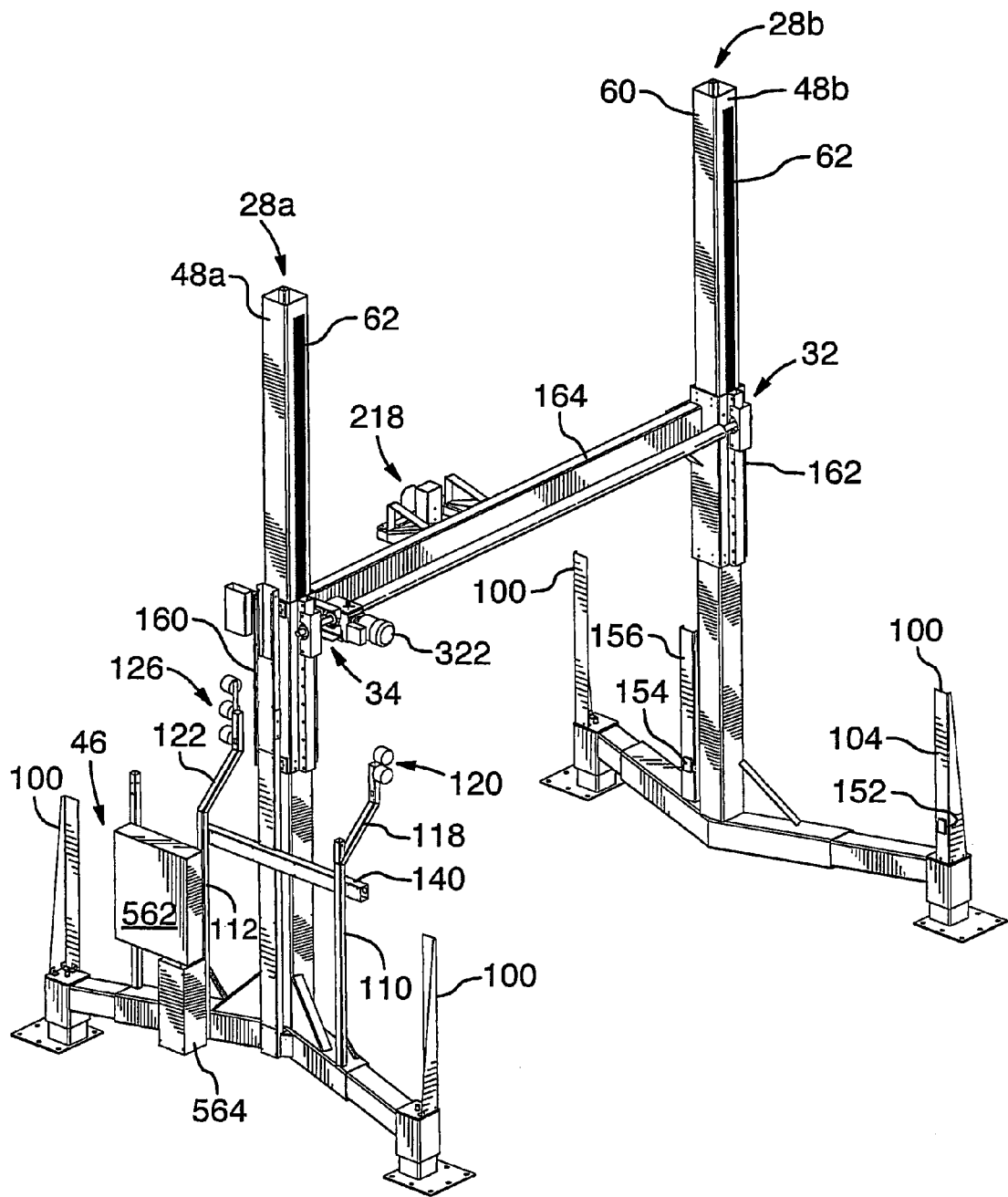
FIG. 5 is a front right perspective view similar to that illustrated in FIG. 1 showing the vehicle snow clearing apparatus with the snow clearing assembly thereof removed for clarity.

Housed within the hollow of the cross-member 140 is a portion of the vehicle position sensing means 146. The sensing means 146 includes a pair of optical sensors in the nature of first and second photoelectric eyes 148 and 150 disposed at the entrance and egress of the apparatus 20, respectively. The first photoelectric eye 148 is located adjacent the front end 142 of the cross-member 140 whereas the second photoelectric eye 150 is disposed between the mast portion 48a and the rear end 144 at a location closer to the mast portion 48a. In cooperation with the reflectors 152 and 154 mounted on upright member 28b, the first and second photoelectric eyes 148 and 150 are operable to detect the position of the vehicle 24 relative to the lifting frame 26 and will be used to ensure that the vehicle is in the proper position beneath the lifting carriage assembly 32 before it is lowered onto the roof 22. As best seen in FIGS. 5 and 6, reflector 150 is located on the external face of the first angle leg 104 of the front right guard member 104, while the reflector 152 is mounted on a third vertical support member 154 standing proud of the second mounting arm 76. The reflectors 150 and 152 are carried at a height lower than the height of the photoelectric eyes 148 and 150. This arrangement tends to minimize errors in detection resulting from light beams being reflected off the reflective safety bands adhered to vehicles, which might otherwise occur if the reflectors 150 and 152 and the photoelectric eyes were fixed at the same height.

Referring now to FIGS. 5, 9, 10a and 10b, in the preferred embodiment, the lifting carriage assembly 32 includes a first carriage portion 160 mounted for travel along the mast portion 48a, a second carriage portion 162 mounted for travel along the mast portion 48b and a cross-member 164 joining the first carriage portion 160 to the second carriage portion 162. Each carriage portion 160, 162 is configured to surround its respective mast portion 48a, 48b in a sleeve-like fashion and has a front wall portion 166, an opposed rear wall 168 and a pair of spaced apart side walls 170 and 172 for placement opposite the front, rear and side faces 54, 56, 58 and 60, respectively, of each mast portion 48a, 48b. The front wall portion 166 and the walls 168, 170 and 172 of each carriage portion 160, 162 cooperate with each other to define an opening 174 sized to receive therethrough the respective mast portion 48a, 48b. The opening 174 is lined with lubricated wear pads 176 mounted to the respective inner faces of the walls 166, 168, 170 and 172 to reduce friction between the carriage portions 160, 162 and their respective mast portions 48a and 48b. While in this embodiment, the carriage portions 160 and 162 completely surround their respective mast portions 48a and 48b, this need not be the case in every application. In other embodiments, the carriage portions could be configured differently so as to only partially surround the mast portions.

As best shown in FIG. 10b, the front wall portion 166 of each carriage portion 160, 162 is a built up section formed by first and second, spaced apart angle members 180 and 182 and a channel member 184 disposed therebetween. Each angle member 180, 182 has a first leg 186 whose distal edge is joined to the edge of the side wall 170, 172 and a second leg 188 which is oriented to extend frontwardly and away from the rear wall 168. The channel member 184 is mounted between the second legs 188 of the angle members 180 and 182 with its back 190 directed away from the first legs 186 and its legs 192 pointing toward the rear wall 168. The legs 192 of the channel member 184 are welded to the second legs 188 of the angle members 180 and 182. The channel member 184 and the second legs 188 cooperate with each other to define a small interior alcove 200 (and corresponding protrusion 202 when viewed externally) within the front wall portion 166 which is configured to accommodate a portion of the carriage drive assembly 34 and a portion of the rack member 62 disposed opposite the front wall 166.

The cross-member 164 is carried between the carriage portions 160 and 162 adjacent their respective upper ends 204. In this embodiment, the cross-member 164 is a hollow rectangular structural steel (HSS) section whose cross-section is defined cooperatively by a front face 206, an opposed rear face 208, a top face 210 and a bottom face 212. The cross-member 164 includes a first end 214 welded to the side wall 168 of the first carriage portion 160, a second end 216 welded to the side wall 170 of the second carriage portion 162, and a cradle member 218 depending from the rear face 208 of the cross-member 164 midway between the first end 214 and second end 216. At each end 214, 216, the weld connection is reinforced by a triangular gusset plate 220 welded along one edge to the bottom face 212 of the cross-member 164 and along another edge to the side wall 170 of the carriage portion 160, 162 (as the case may be).

Figure 9A:
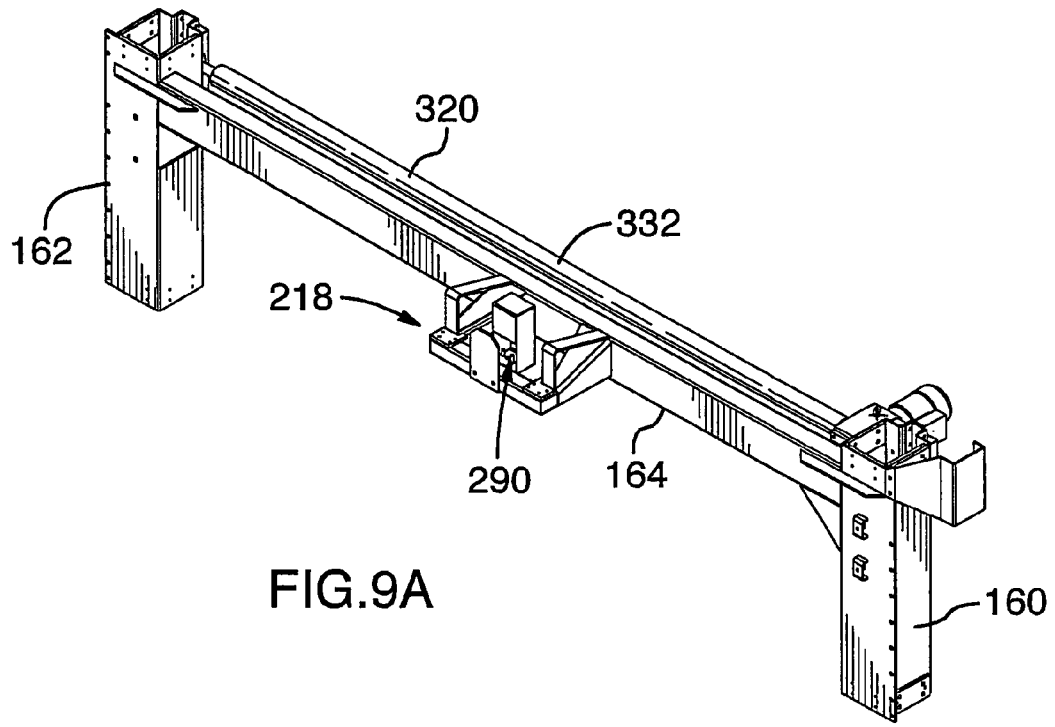
FIG. 9a is an isolated, rear left perspective view of the lifting carriage assembly and the carriage drive assembly shown in FIG. 5.
Figure 9B:
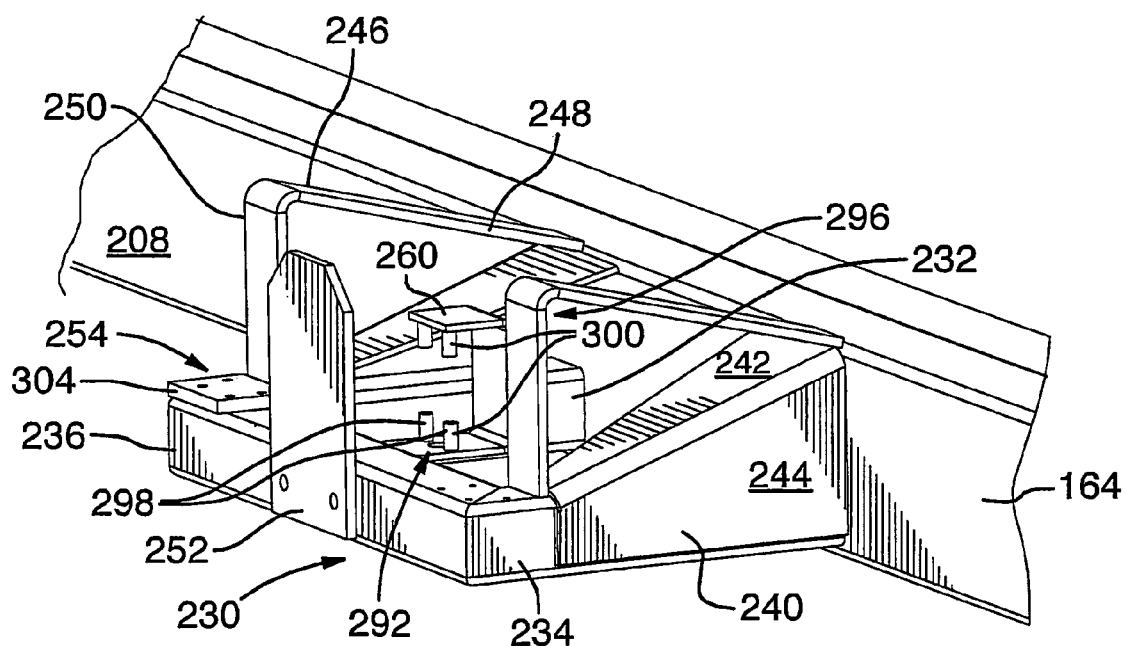

With specific reference to FIGS. 9a and 9b, the cradle member 218 is configured to releasably hold the snow clearing assembly 36 suspended between the first and second upright members 28a and 28b. While in this embodiment, the cradle member 218 depends from rear face 208 of the cross-member 164, this need not be the case in every application. In an alternative embodiment, the cradle member may be mounted on one of the other faces of the cross-member. In still another embodiment, the cradle member may be configured differently, or more than one cradle member may be provided.

The cradle member 218 is a built up section which includes a generally U-shaped bracket member 230 having a first arm 232, an opposed second arm 234 and a back 236 mounted to extend between, and join, the first arm 232 to the second arm 234. With the distal ends of the arms 232 and 234 being welded to the cross-member 164, the back 236 is spaced away from the rear face 208. The connection of each arm 232, 234 to the cross-member 164 is further strengthened by a reinforcement cover plate 240 placed over each arm 232, 234. Each cover plate 240 is a three-sided member with a top face 242 and a pair of spaced apart side faces 244 depending therefrom and joined thereto at radiused corners. In profile, the cover plate 240 has a generally trapezoidal shape. At its widest portion, the cover plate 240 is welded along its edges to the rear face 208. Disposed above each cover plate 240 is a bent plate member forming an angle 246 having a horizontally extending leg 248 and vertically extending leg 250. The distal end of the horizontally extending leg 248 is welded to the cross-member 164 at the juncture of the cover plate 240 with the rear face 208, whereas the distal end of the vertically extending leg 250 is welded to the mounting bracket 230 at the juncture of the narrow portion of the cover plate 240 with the arms 232, 234.

Fastened to the back 236 of the bracket member 230 is an upwardly extending, elongate plate 252. The plate 252, the top face of the back 236 and the vertically extending legs 250 cooperate with each other to define a generally U-shaped station 254 (when viewed from the side as shown in FIG. 6) which is sized to receive therein a portion of a suspension arm 256 from which the snow clearing assembly 36 hangs.

Figure 3B:
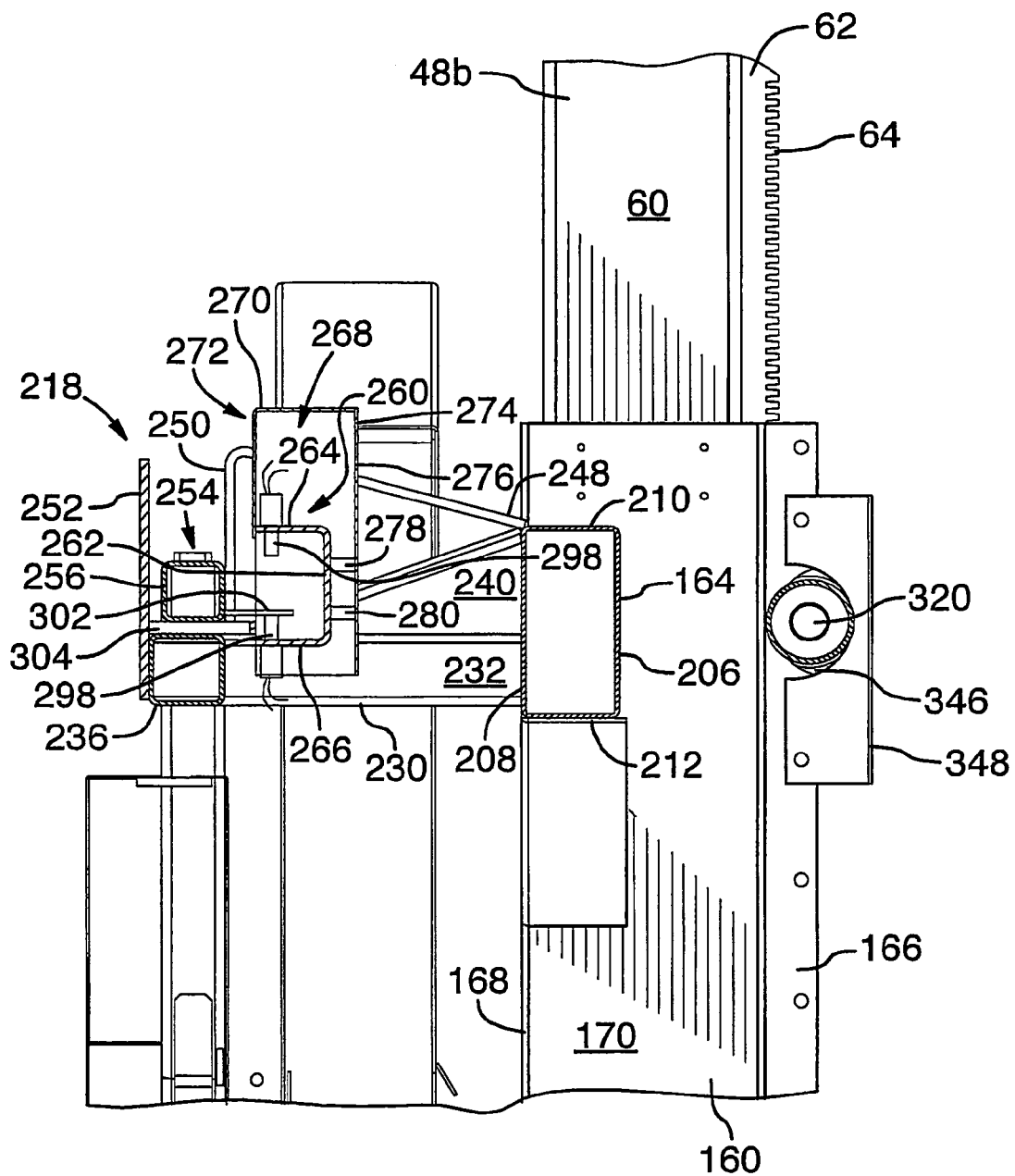
FIG. 3b is a cross-sectional view of the vehicle snow clearing apparatus shown in FIG. 3a taken along line '3b-3b'.

As best shown in FIGS. 3b and 9b, a horizontally oriented channel member 260 is disposed opposite the plate 252 with a back 262 and a pair of upper and lower legs 264 and 266 extending rearwardly away therefrom toward the plate 252. The distal end of the lower leg 266 is welded to the front face of the mounting bracket back 236. A cover plate 268 and a bent plate member 270 cooperate with each other to define a protective housing 272 which partially encloses the channel member 260. The cover plate 268 is defined by a vertically oriented channel member 274 whose back 276 is attached to the back 262 of the channel member 260 by fastening members 278 and 280. The bent plate member 274 has a horizontal portion 282 and a vertical portion 284 downwardly depending from the horizontal portion 282. The distal edge of the horizontal portion 282 is welded to the edge of the back 262 and its side edges are welded to the horizontal edges of the legs 264 and 266. The side edges of the vertical portion 284 are welded to the vertical side edges of the legs 264 and 266.

The channel member 260 carries means 290 for sensing the position of the suspension arm 256 within the station 254. The position sensing means 290 includes a first sensor 292 operable to detect the suspension arm 256 in a first lower position 294 and a second sensor 296 operable to detect the suspension arm 256 in a second upper position (not shown). In this embodiment, the first and second sensors 292 and 296 each have a pair of plunger-type, pressure-sensitive contact pins 298 and 300. The contact pins 298 and 300 of the first sensor 292 are mounted to the channel member leg 264 in opposition to the contact pins 298 and 300 of the second sensor 296 carried by the channel member leg 266. In this embodiment, the spacing between the opposed pairs of contact pins 298 and 300 is 2 inches. Thus arranged, the contact pins 298 and 300 of each sensor 292 and 296 may be abutted by a tongue member 302 that depends from the suspension arm 256 and extends forwardly into the space defined between the channel member legs 264 and 266. The use of two contact pins 298 and 300 is preferred over the provision of a single contact pin because with two contact pins, the orientation of the snow clearing assembly 36 may be more accurately monitored, for instance, in the case where one side of the snow clearing assembly is carried higher than the other.

In the first lower position 294, the suspension arm 256 abuts pads 304 disposed on the top face of the bracket member back 236 and the tongue member 302 bears against the contact pins 298 and 300 of the first sensor 292. In the second upper position, the suspension arm 256 is spaced from the pads 304 and the tongue member 302 bears against the contact pins 298 and 300 of the second sensor 296. When the suspension arm 256 is in the second upper position, the position sensing means 290 transmits a signal to the controller 46 in response to which the controller 46 cuts power to the carriage drive assembly 34 thereby preventing the lifting carriage assembly 32 from being further lowered. As will be explained in greater detail below, this arrangement will be used to detect and prevent the application of undue pressure on the roof 22 of the vehicle 24 when the snow clearing assembly 36 is lowered into position thereon and to may also be employed to ensure the snow clearing assembly maintains a proper orientation during deployment.

In the present embodiment, the snow clearing assembly 36 is releasably detachable from lifting carriage assembly 32 to allow for maintenance, servicing and/or replacement of the snow clearing assembly without having to decouple the lifting carriage assembly from the lifting frame. Additionally, this feature tends to facilitate assembly/disassembly of the apparatus 20. However, in another embodiment, the lifting carriage assembly and the snow clearing assembly could be constructed as a single unit.

Referring now to FIGS. 5, 7, 8 and 10, the carriage drive assembly 34 is now described in greater detail below. The carriage drive assembly 34 includes a drive shaft 320 mounted for rotation between the first and second carriage portions 160 and 162, a drive motor 322 for driving rotation of the drive shaft 320 and a pair of first and second drive gears 324 and 326 attached to the drive shaft 320. The drive shaft 320 has a first end portion 328, an opposed second end portion 330 and an intermediate portion 332 spanning between the first and second end portions 328 and 330. In this embodiment, the drive shaft 320 is a built up member with solid end portions 328 and 330 welded to a tubular section defining the intermediate portion 332.

For convenience, the drive motor 322 is preferably, an electric motor. However, other types of drive motors (i.e. pneumatic or hydraulic) may also be used, if desired, with the appropriate accommodations being made to take into account the extreme cold temperatures and weather conditions in which the drive motor will likely be operated.

The drive motor 322 is carried on the back 334 of a channel member 336 whose first end 338 is welded to the front face 206 of the cross-member 164. The legs 340 and 342 of the channel member 336 are welded at their distal ends to the side wall 168 of the first carriage portion 160. The back 334 of the channel 336 has an aperture 344 defined therein to allow the drive shaft 320 to extend therethrough.

The first drive gear 324 is attached to the first end portion 328 and is mounted opposite the front face 54 of the mast portion 48a for geared engagement with the rack member 62 mounted thereon. Similarly, the second drive gear 326 is attached to the second end portion 330 and is mounted opposite the front face 54 of the mast portion 48b for geared engagement with the corresponding rack member 62. A cutout 346 defined in the protruding portion 202 of each carriage portion front wall 166 provides each drive gear 324, 326 with access to a respective rack member 62. Cover plates 348 fastened to the carriage portions 160 and 162 are further provided to protect the drive gears 324 and 326.

When the drive motor 322 is actuated, the drive shaft 320 is urged to rotate either in the clockwise direction (to raise the lifting carriage assembly 32) or counterclockwise direction (to lower the lifting carriage assembly 32). The gear teeth 350 of each drive gear 324, 326 intermesh with the teeth 64 of the rack members 62 to thereby cause each carriage portion 160, 162 to ride the mast portion 48a, 48b upwards or downwards.

Figure 22:
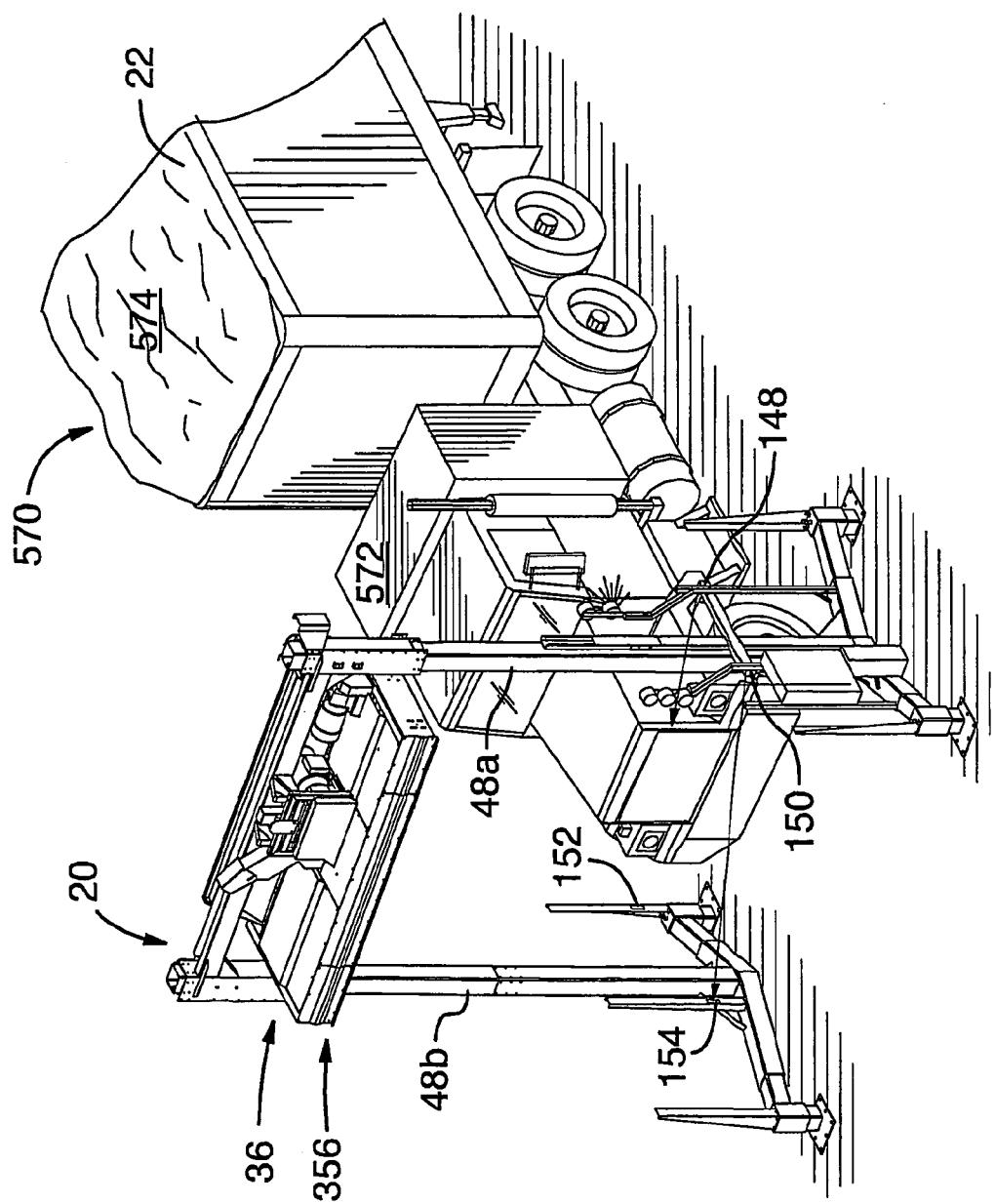
FIG. 22 is another rear right perspective view showing the vehicle engaged between the upright members of the lifting frame with the nose of vehicle cab portion extending beyond the first optical sensor.
Figure 23:
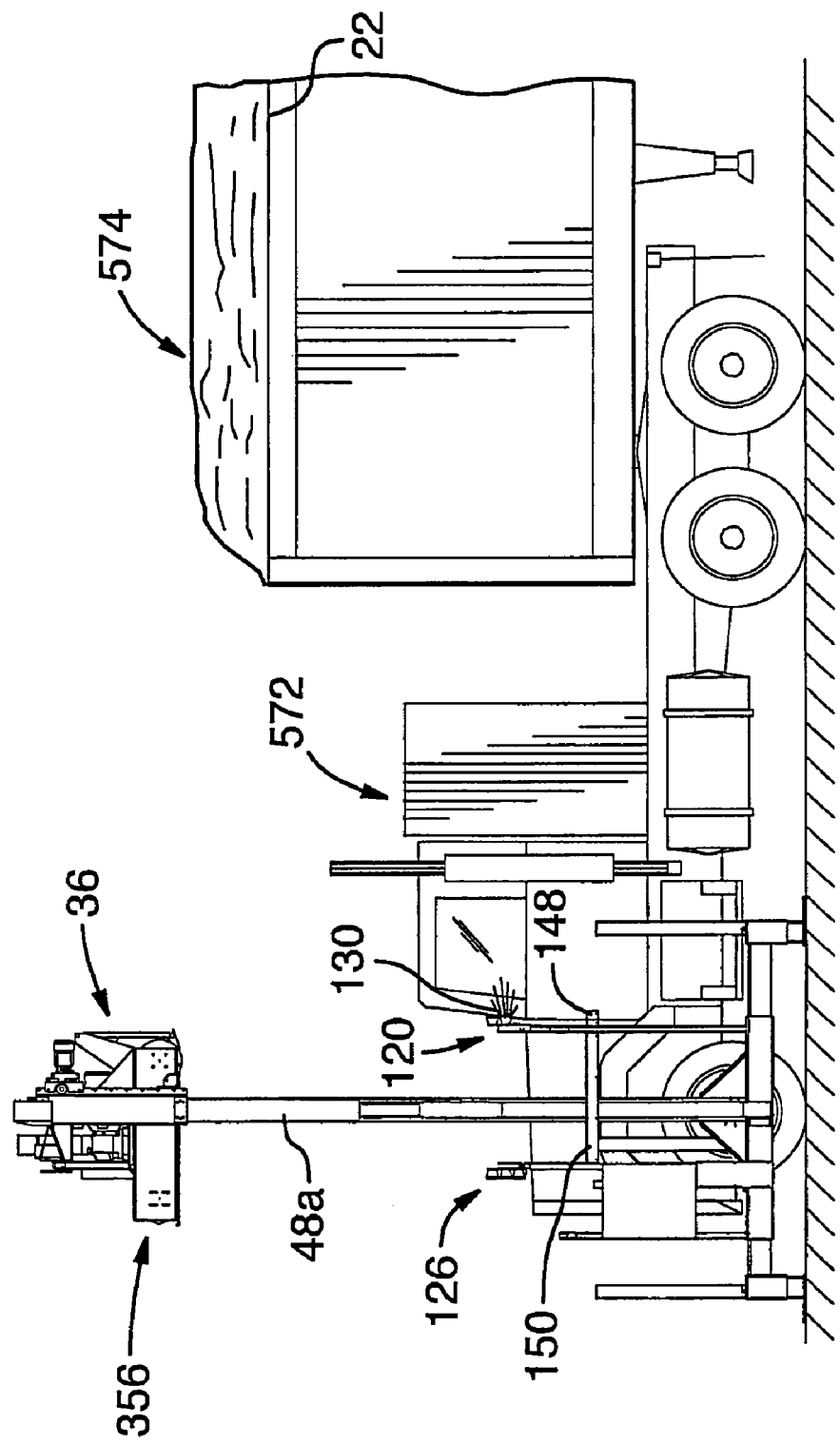
FIG. 23 is a side elevation view of the vehicle and vehicle snow clearing apparatus illustrated in FIG. 22 showing the vehicle engaged within the vehicle snow clearing apparatus, with the vehicle cab portion extending beyond both the first and second optical sensors.
Figure 24:
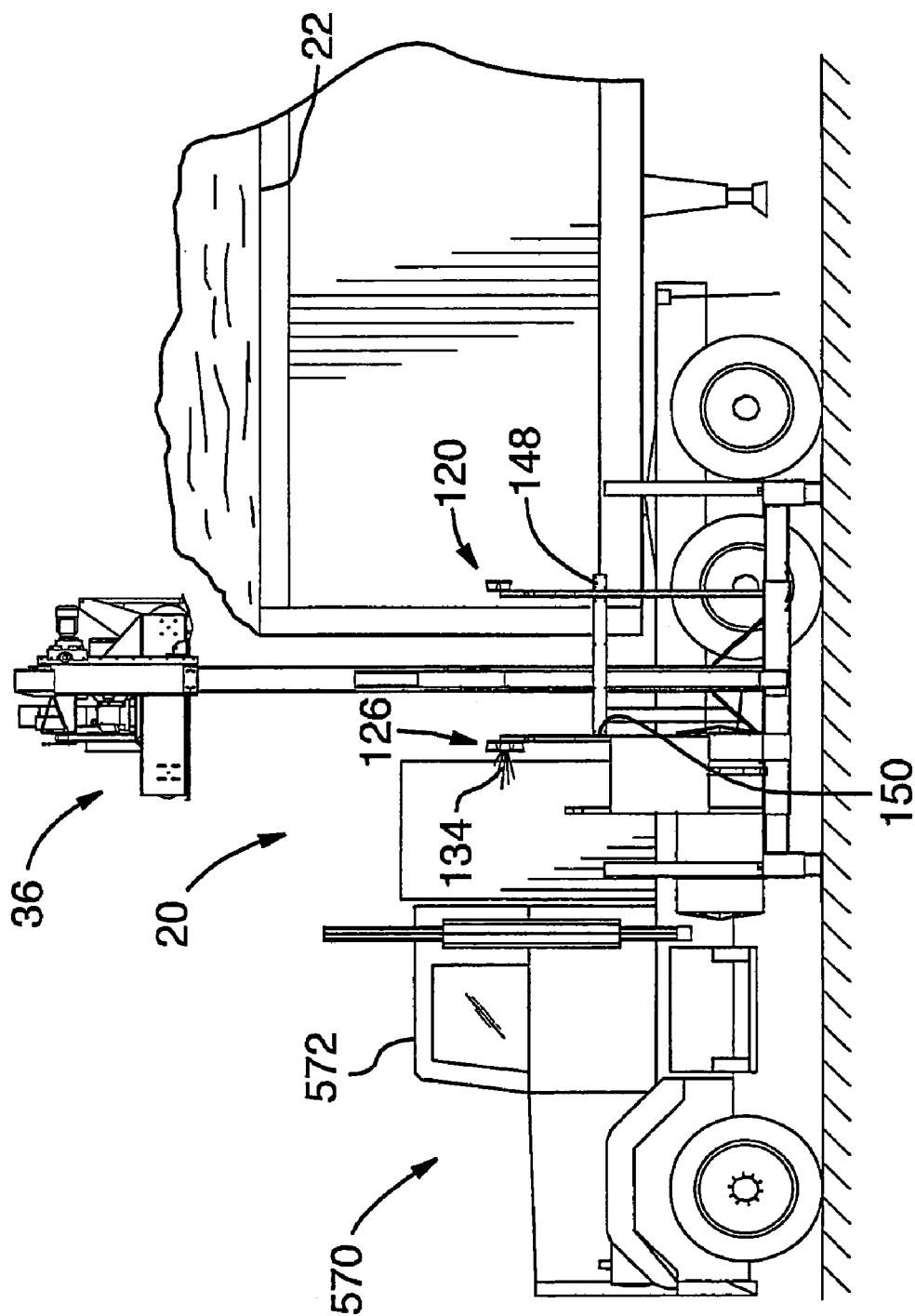
FIG. 24 is a side elevation view of the vehicle and vehicle snow clearing apparatus illustrated in FIG. 22 showing the vehicle engaged within the vehicle snow clearing apparatus, with the vehicle trailer portion extending beyond the first optical sensor.

The carriage drive assembly 34 includes a pair of upper and lower carriage displacement limit switches 352 and 354 operatively connected to the controller 46 for restricting travel of the lifting carriage portion 34 within a predetermined range of heights lying between a first upper limit position 356 (see FIG. 22) and a second lower limit position 358 (see FIG. 1). Preferably, the limit switches 352 and 354 are plunger-type switches. However, in alternative embodiments, toggle switches could also be employed. The upper limit switch 352 is mounted on the mast portion 48a adjacent its top end 70 while the lower limit switch 354 is attached to the mast portion 48a adjacent its bottom end 72. In operation, when the carriage portion 160, 162 is urged to bear against the switch 352, 354, the switch transmits a signal to the controller 46 indicating that the upper or lower displacement limit (i.e. the first upper limit position 356 or the second lower limit position 358, as the case may be) has been reached. In response, the controller 46 will cut power to the drive motor 322 thereby arresting movement of the lifting carriage assembly 32.

The drive motor 322 is also provided with a load limit switch (not shown) that is operable to cut power to the drive motor 322 in the event the current draw on the drive motor 322 exceeds a predetermined load limit. In this way, damage to the drive motor may be avoided in situations where a jam has occurred between the carriage portion and the mast portion (or more specifically, the drive gear and toothed rack member).

While in the present embodiment, the apparatus 20 is provided with a pair of upright members 28a and 28b and a corresponding pair of carriage portions 160 and 162, it will be appreciated that in alternative embodiments, different arrangements may be employed. For instance, the carriage portions may be replaced in favour of an outer telescopically mounted over an inner with the outer being hydraulically or pneumatically powered for movement relative to the inner. Other modifications could be brought to the lifting frame. In a further alternative, the lifting frame may be provided with a single mast portion carrying a moveable boom that may be raised or lowered. In such an embodiment, the snow clearing assembly would be suspended from the boom.

With reference to FIGS. 11, 12, 13, 17 and 18 the snow clearing assembly 36 is now described in greater detail. The snow clearing assembly 36 includes blower means 40, the pair of first and second rotatable auger members 42 and 44 and a brush member 376—all at least partially disposed within a housing 38. The housing 38 has a front end 380, an opposed rear end 382 and a pair of spaced apart, first and second side frame members 384 and 386 extending between the front and rear ends 380 and 382. Mounted at the front end 380 of the housing 38 is a snow hood 388.

Figure 18:
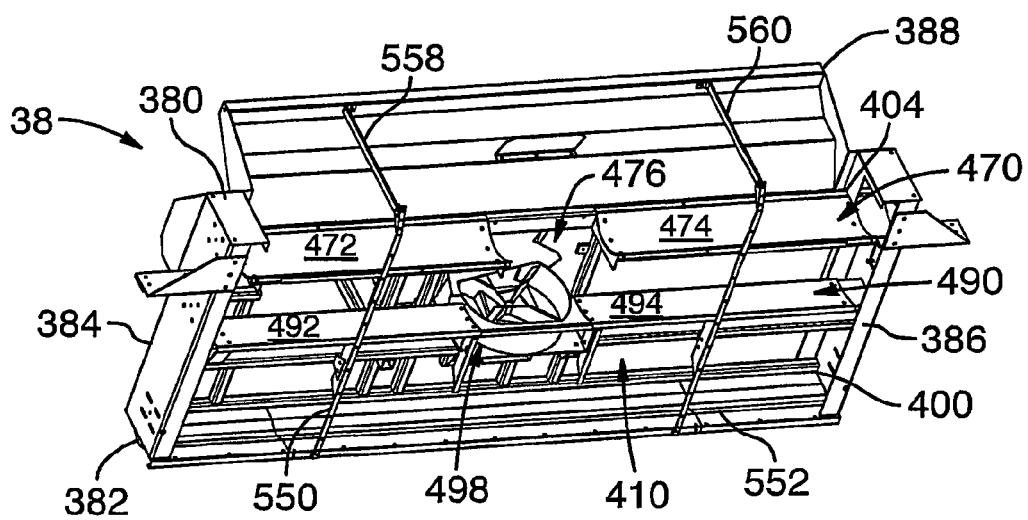
FIG. 18 is a top plan view of the framework shown in FIG. 17.
Figure 19:
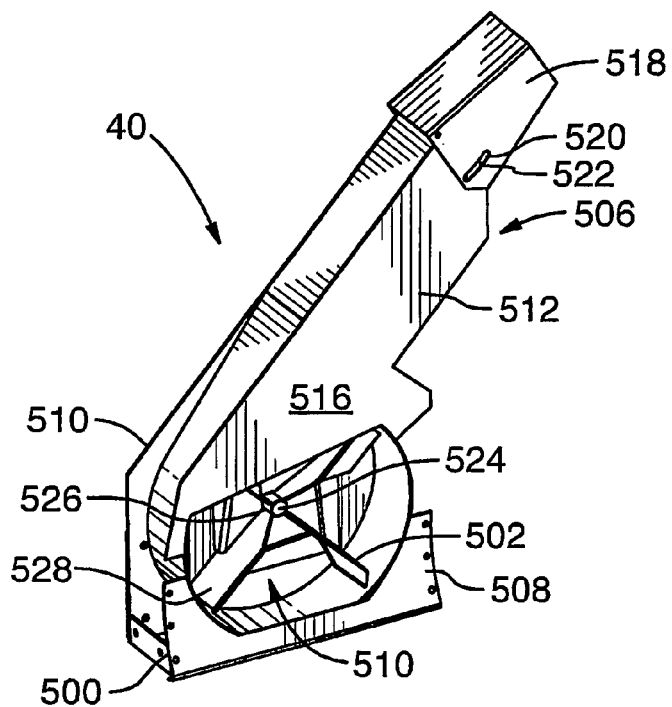
FIG. 19 is a perspective view of the blower shown in FIG. 17.
Figure 20:
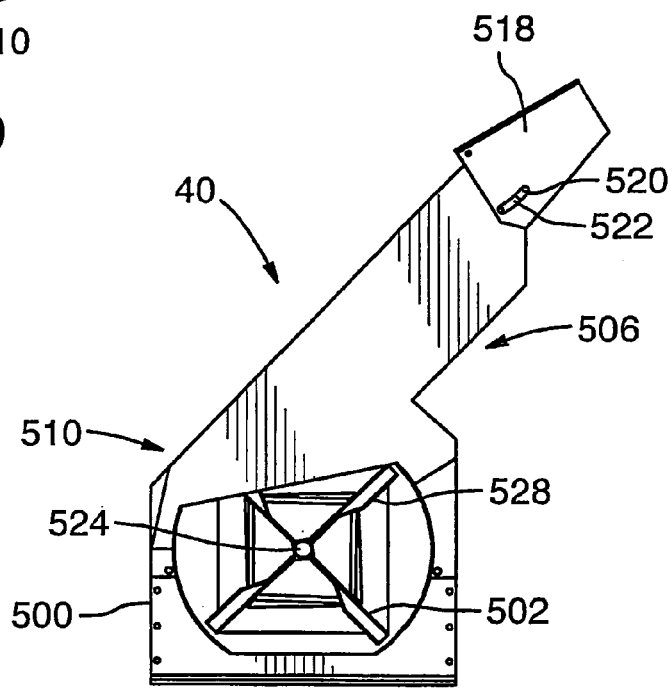
FIG. 20 is a front elevation view of the blower shown in FIG. 17.

Referring specifically to FIG. 18, first, second and third, spaced apart cross-members 400, 402 and 404 extend between the side frame members 384 and 386 and attach the first side frame member 384 to the second side frame member 386. The first cross-member 400 is disposed adjacent the front end 380 of the housing 38 while the second cross-member 402 is mounted adjacent the rear end 382. The third cross-member 404 is positioned between the first and second cross-members 400 and 402. Dog-legged stringers 406, 408, 410 and 412 tie the cross-members 400, 402 and 404 to each other. The side frame members 384 and 386, the cross-members 400, 402 and 404 and the stringers 406, 408, 410 and 412 cooperate with each other define an open framework 414 which supports the auger members 42 and 44, the brush member 376 and the blower means 40.

Figure 12:
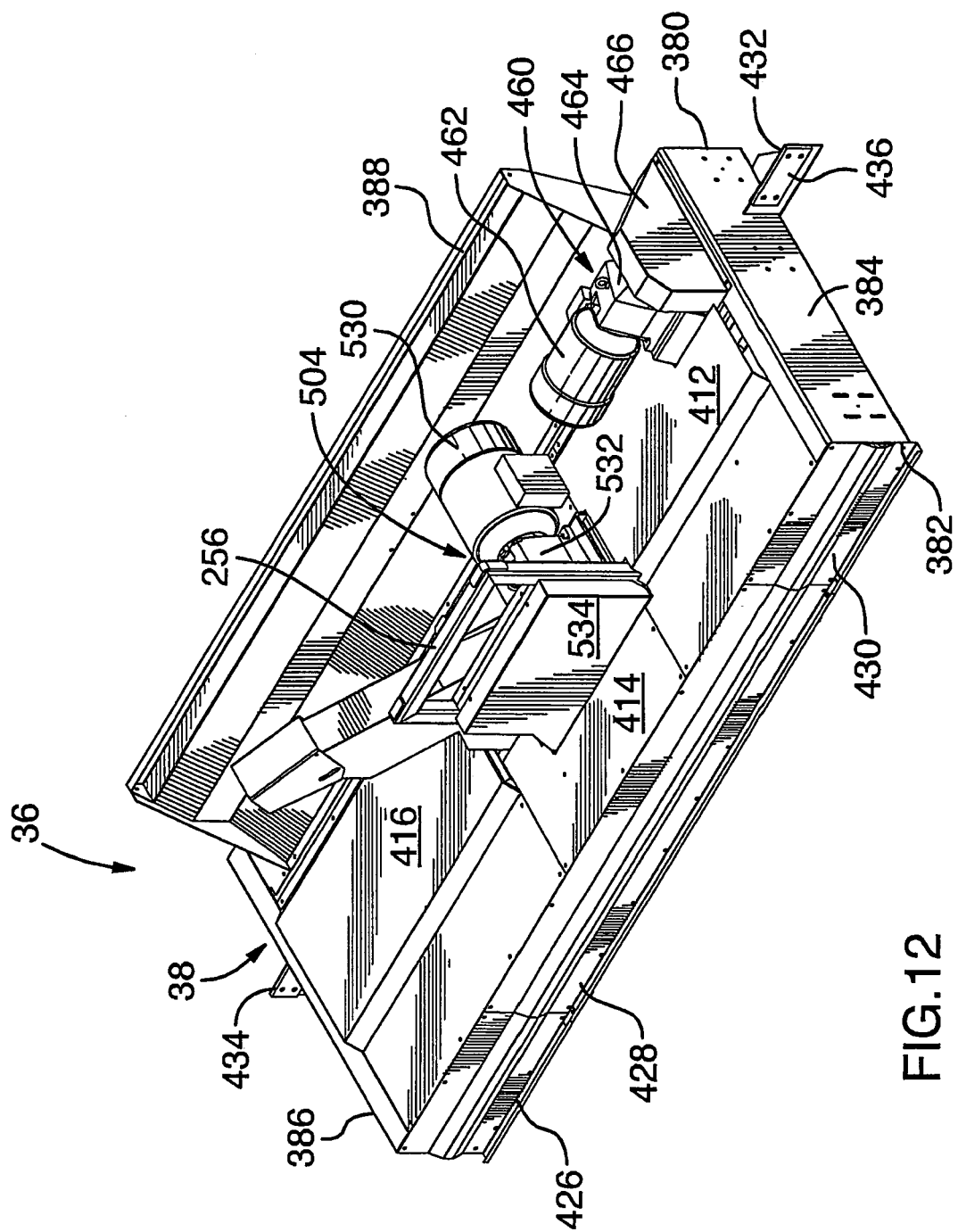
FIG. 12 is an isolated, top rear left perspective view of the snow clearing assembly shown in FIG. 11.

The housing 38 remains open along its bottom to permit the auger members 42 and 44 and the brush member 376 to engage accumulated snow when the snow clearing assembly 36 is placed onto the roof 22 of the vehicle 24 and actuated. As best shown in FIG. 12, top panel members 412, 414 and 416 are mounted side-by-side between the first and second side frame members 384 and 386 to cover the top of the framework 410. Extending upwardly through the top of the housing 38 is a pair of arms 420 and 422 between which is mounted the suspension arm 256. The arms 422 and 424 serve to tie the suspension arm 256 to the framework 410. Rear panel members 426, 428 and 430 close off the rear end 382 of the housing 38.

To discourage the snow clearing assembly 36 from pivoting forwardly about the cradle member 218, each side frame member 384, 386 has adjacent the front end 380 of the housing 38, a guide plate 432, 434 that extends perpendicular to the side frame member. Each guide plate 432, 434 has a face 436 that is adapted to bear against the carriage portion 160, 162. When the snow clearing assembly is suspended from the suspension arm 256, the faces 436 of guide plates 432 and 434 abut the front wall portions 166 of carriage portions 160 and 162. In alternative embodiments, either guide means may be employed to similar advantage.

Figure 13:
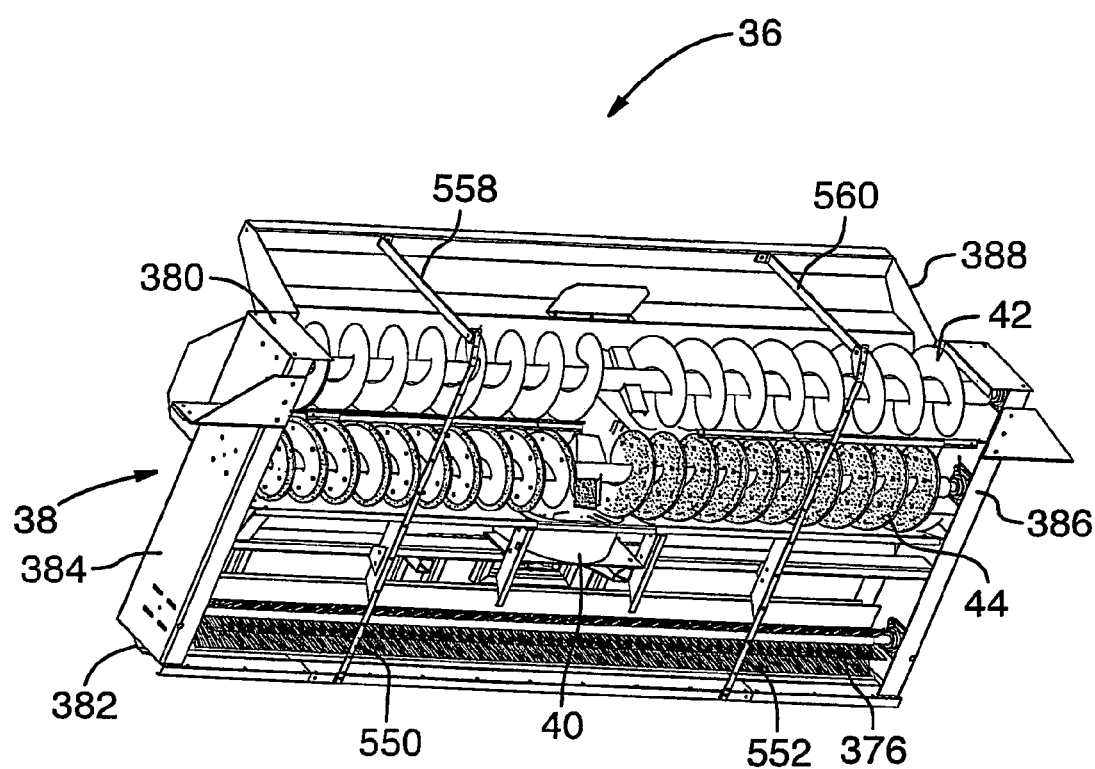
FIG. 13 is an isolated, bottom front left perspective view of the snow clearing assembly shown in FIG. 11.
Figure 16:
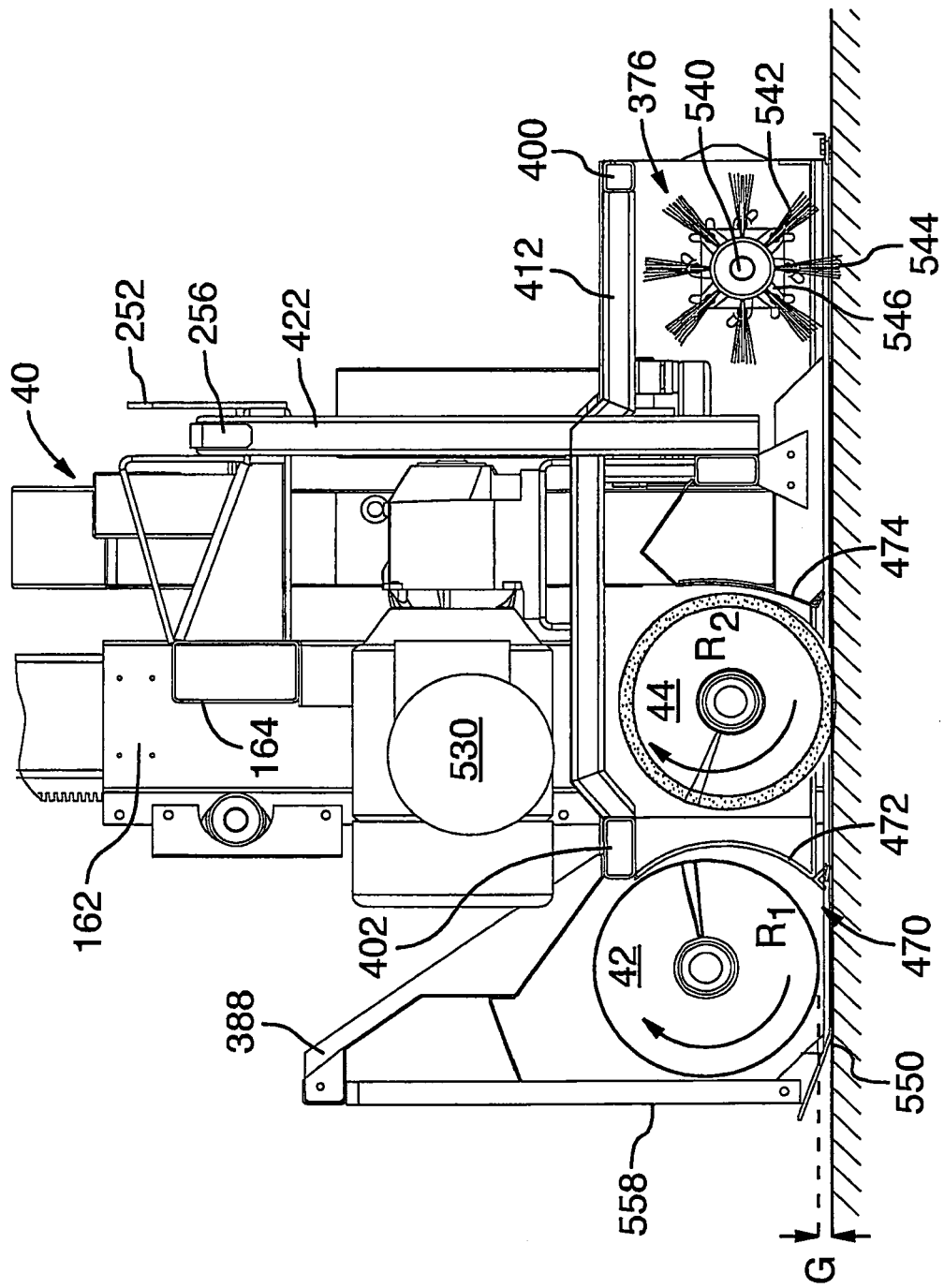
FIG. 16 is a cross-section view of the snow clearing assembly shown in FIG. 12 taken along line '16-16'.

Referring specifically to FIG. 13, the first and second auger members 42 and 44 are mounted for rotation between the first and second side frame members 384 and 386. The auger members 42 and 44 are disposed in tandem between the front and rear ends 380 and 382 of the housing 38—with the first auger member 42 being carried in front of the second auger member 44. Each auger member 42, 44 has an axis of rotation $R_1$, $R_2$, respectively. As best shown in FIG. 16, the rotational axis $R_1$ of the first auger member 42 is carried higher than the rotational axis $R_2$ of the first auger member 44 such that the lowest extremity of the first auger member 42 is spaced away from the roof 22 and does not directly bear against it when the snow clearing assembly is deployed. More specifically, the height of the rotational axis $R_1$ is adjusted so as to have a gap G between the lowest extremity of the first auger member 42 and the roof 22. In this embodiment, the gap G measures 1 inch.

Figure 14A:
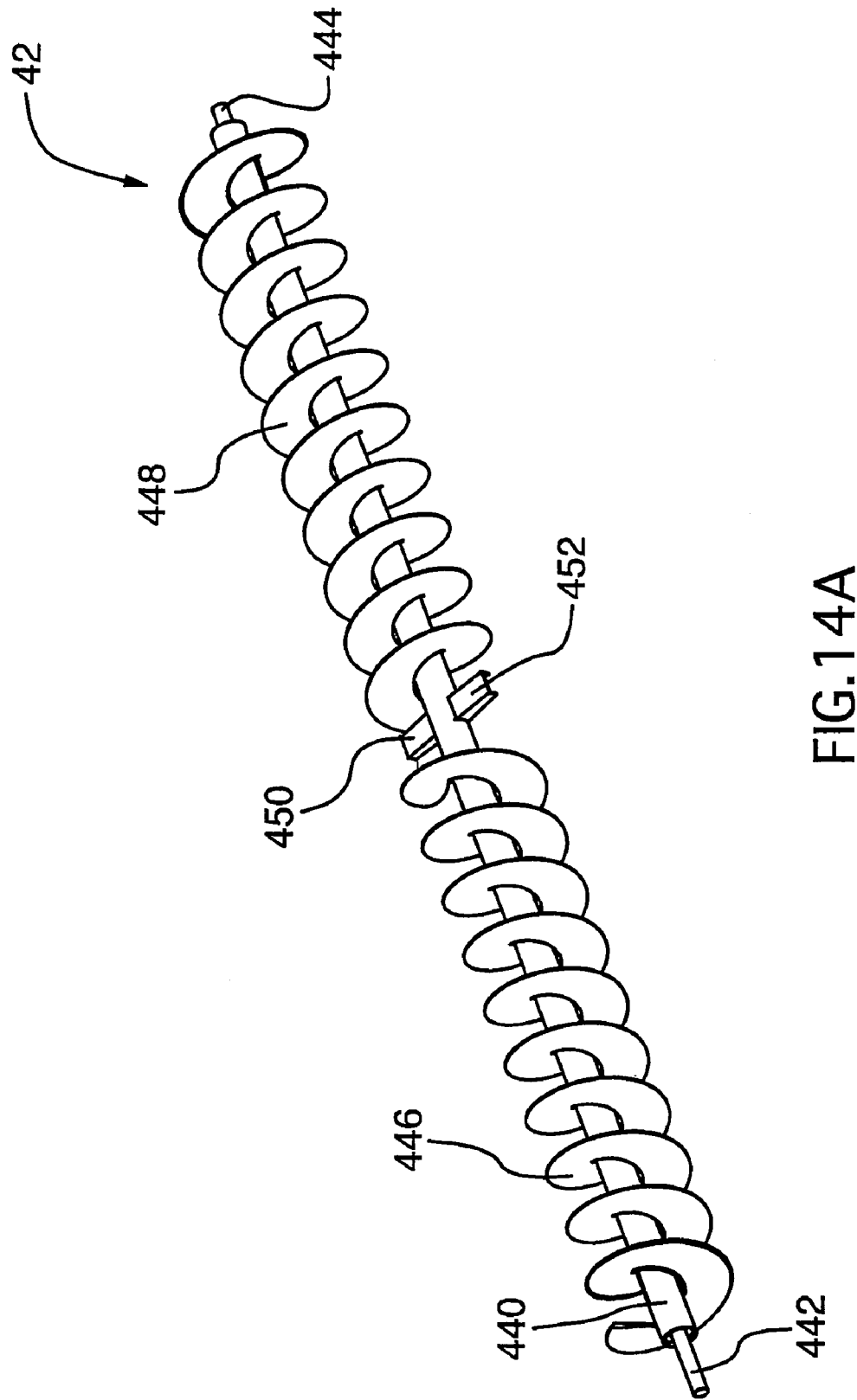
FIG. 14a is a perspective view of the first auger member shown in FIG. 13.

The first auger member 42 is constructed from a rigid material (such as steel or the like) selected for its excellent strength characteristics and resistance to wear to permit the auger member 42 to break up the accumulated snow and ice on the roof 22, which in some cases may be several inches thick. In the present embodiment, the first auger member 42 is sized such that its length is at least as great as the width of the roof 22 of the vehicle 24. Referring now to FIG. 14a, the first auger member 42 possesses a shaft 440 having a first end 442, an opposed second end 444 and first and second helical blade members 446 and 448. The first helical blade member 446 extends inwardly from the first end 442 with a right hand thread, stopping short of the center of the shaft 440. In like fashion, the second helical blade member 448 extends inwardly from the second end 444, but has an opposite (left hand) thread. Thus configured, the first and second helical blade members 446 and 448 define the bidirectional auger structure of the first auger member 42. In the longitudinal gap defined between the helical blade members 446 and 448, a pair of vane members 450 and 452 extends radially from the shaft 440 at circumferentially staggered locations. In this embodiment, the vane members 450 and 452 are spaced 180° degrees from each other. When the first auger member 42 is urged to rotate, the vanes 450 and 452 will serve to move the snow toward the second auger member 44 and ultimately, toward blower means 40.

The second auger member 44 is generally similar to the first auger member 42 in both size and structure. More specifically, the second auger member 44 has a shaft 602 not unlike shaft 440. The shaft 602 includes a first end 604, an opposed second end 606 and first and second helical blade members 608 and 610. In like fashion to the blade member 446, the first helical blade member 608 extends inwardly from the first end 604 with a right hand thread, stopping short of the center of the shaft 602. Similarly, the second helical blade member 610 extends inwardly from the second end 606, but has an opposite (left hand) thread. Thus configured, the first and second helical blade members 608 and 610 define the bidirectional auger structure of the second auger member 44.

Figure 14B:
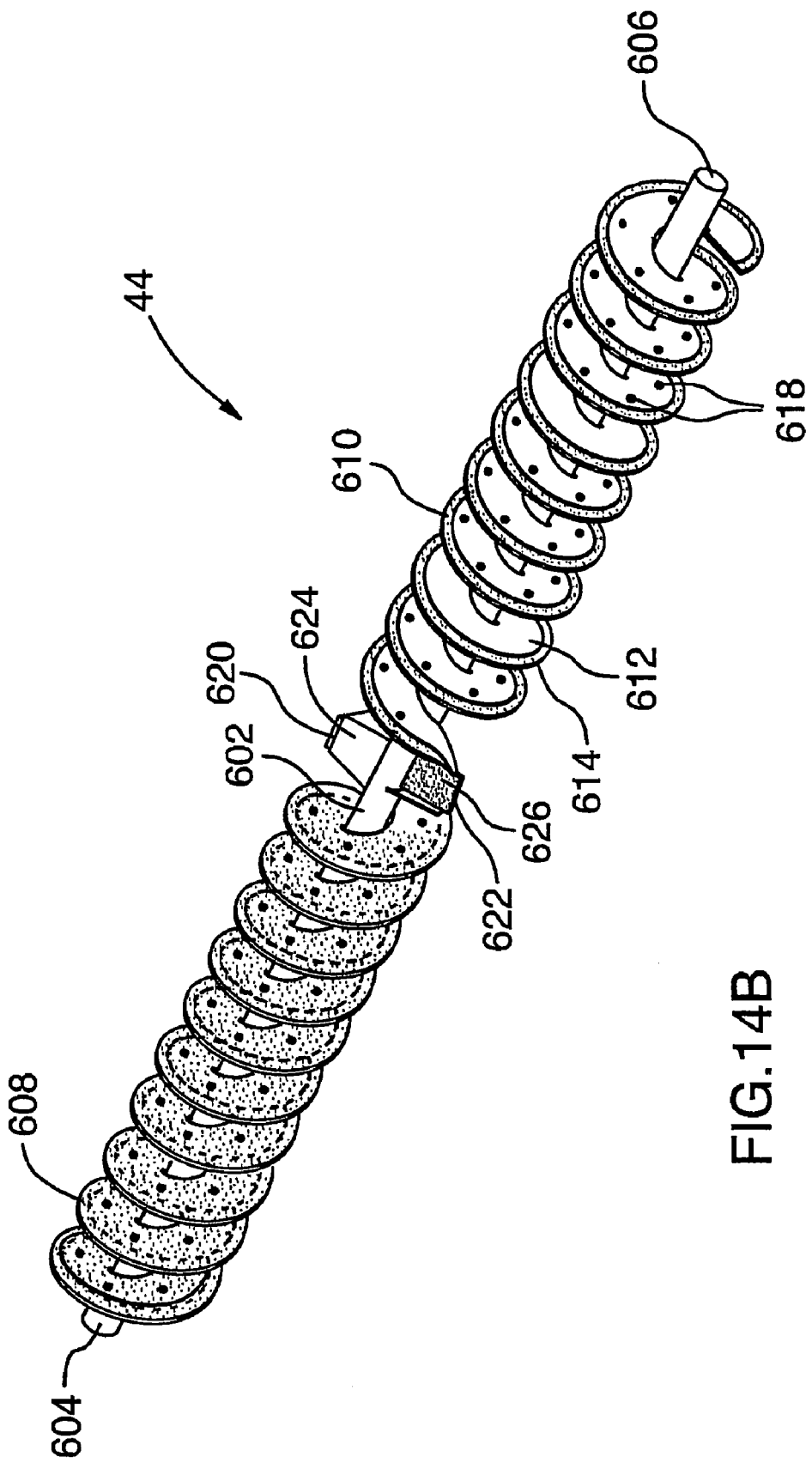
FIG. 14b is a perspective view of the second auger member shown in FIG. 13.

However, the first and second helical blade members 608 and 610 differ from their counterpart helical blade members 446 and 448 in the first auger member 42 in that they are of two-part construction with each helical blade member 608, 610 having a first rigid helical portion 612 welded to the shaft 602 and a second flexible helical portion 614 attached to the inward face of the first rigid helical portion 612 by fasteners 618. The first rigid helical portion 612 is constructed of a rigid material such as steel or the like, while the second helical flexible portion 614 is made of a resilient material such as rubber, silicon or other similar elastomeric material exhibiting excellent flex characteristics and wear resistance. In this arrangement, the first rigid helical portion 612 serves as a backing for the second flexible helical portion 614 and provides structural support thereto. As best shown in FIG. 14b, a part of the second flexible helical portion 614 extends beyond the radial edges of the first rigid helical portion 612. During operation of the snow clearing assembly 36 at least a part of the second flexible helical portion 614 will flex when borne against the roof 22 thereby removing the snow and ice remnants from the passage of the first auger member 42. It will thus be appreciated that the provision of the second flexible helical portion 614 serves a dual purpose—it carries out a snow clearing/transport function while protecting the roof 22 from damage that might otherwise occur if the first rigid helical portion 612 was permitted to make contact with the roof 22.

In the present embodiment, the second flexible helical portion 614 is attached to the inward face of the rigid helical portion 612 by fasteners 618. This configuration and means of attachment need not be employed in every application. In an alternative embodiment, the rigid helical portion may be encased with a flexible, resilient material. In a further alternative, with the appropriate selection of a flexible material, the helical blade members could be wholly made of a flexible, resilient material.

As best shown in FIG. 14b, in the longitudinal gap defined between the helical blade members 608 and 610, a pair of vane members 620 and 622 extends radially from the shaft 602 at circumferentially staggered locations. In this embodiment, the vane members 620 and 622 are spaced 180° degrees from each other. Each vane member 620, 622 has a rigid vane portion 624 made of steel or the like and a flexible vane portion 626 attached to one of the faces of the rigid vane portion 624. A part of the flexible vane portion 626 extends beyond the distal edge of the rigid portion 624 to make contact with the roof 22 when the snow clearing assembly 36 is actuated. More specifically, when the second auger member 46 is rotated, at least a part of the flexible vane portion 626 will flex thereby avoiding causing damage to the roof 22.

Figure 15:
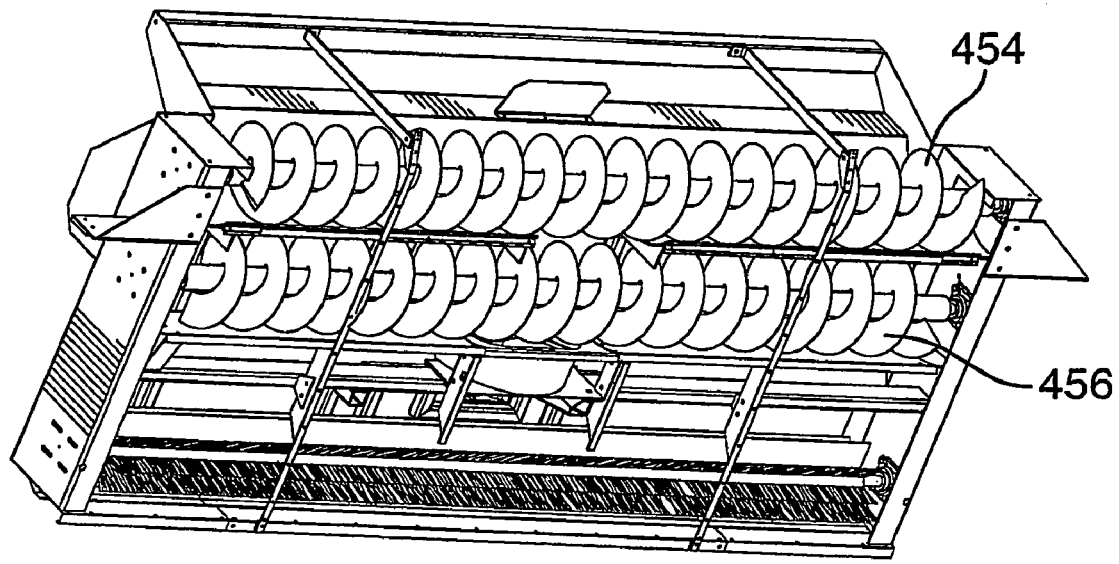
FIG. 15 is an isolated, bottom front left perspective view of an alternate snow clearing assembly to that shown in FIG. 13.

While in the preferred embodiment, the first and second auger members 42 and 44 are bidirectional auger members, it should be appreciated that this need not be the case in every application. In an alternative embodiment, the auger members could be configured differently. For instance, it may be possible to do away with the central vane members and to have a continuous helical blade member running from one end of the auger member shaft to the other. Such an embodiment is shown in FIG. 15, wherein alternate first and second auger members are designated with reference numerals 454 and 456, respectively.

An auger drive assembly 460 drives rotation of the first and second auger members 42 and 44 about their axes of rotation $R_1$ and $R_2$ (in both cases, in the same direction). As best shown in FIG. 12, the auger drive assembly 460 is supported on the framework 410 and includes a drive motor 462, a gearbox 464 operatively connected to the drive motor 462 and a chain and sprocket arrangement (not shown) disposed at least partially within a transmission housing 466. The chain and sprocket arrangement is operable to transmit to the auger members 42 and 44 the torque delivered by the gearbox 464.

Preferably, the drive motor 462 is an electric motor. However, other types of drive motors (i.e. pneumatic or hydraulic) may also be used, if desired, with the appropriate accommodations being made to take into account the extreme cold temperatures and weather conditions in which the drive motor will likely be operated.

In like fashion to the drive motor 322, the drive motor 462 is provided with a load limit switch (not shown) that is operable to cut power to the drive motor 462 in the event the current draw on the drive motor 462 exceeds a predetermined load limit. In this way, damage to the drive motor may be avoided in situations where, for instance, the snow exerts an excessive force on the auger members 42 and 44.

Figure 17:
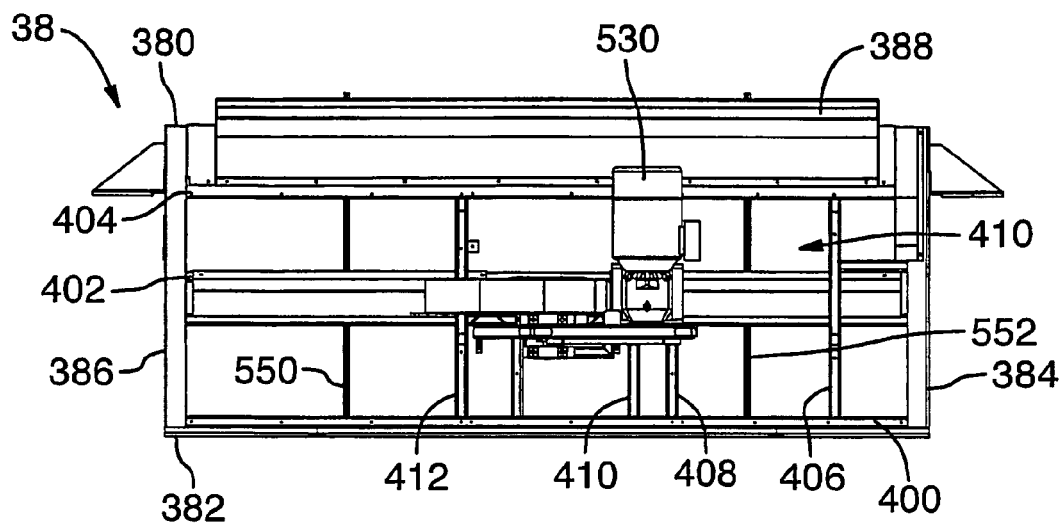
FIG. 17 is a bottom perspective view of the framework of the housing with the top panels of the housing, the auger members and the brush member removed for clarity.

Mounted behind the first auger member 22 is first snow guide means 470 in the nature of first and second snow guide members 472 and 474 (best shown in FIG. 17). The snow guide members 472 and 474 are attached along their upper edges to the third cross-member 404. The first snow guide member 472 extends inwardly from the first side frame member 384, but stops short of the center of the housing 38. Similarly, on the opposite side, the second snow guide member 474 extends away from the second side frame member 386 toward the center of the housing 378 stopping short thereof such that a gap 476 is defined between the snow guide members 472 and 474. As will be explained in greater detail below, during the deployment of the snow clearing assembly 36, the rotation of the first auger member 42 will cause snow to be displaced along the first and second snow guide members 472 and 474 toward the center of the housing 38 whereat it will be pushed through the gap 476 by vane members 450 and 452 to be engaged by the second auger member 44. As best seen in FIG. 14, when viewed in cross-section, the snow guide members 472 and 474 have a generally arcuate profile.

The snow clearing assembly 36 also has a second snow guide means 490 disposed behind the second auger member 44. The second snow guide means 490 includes a third snow guide member 492 extending inwardly from the first side frame member 384 and a fourth snow guide member 494 extending inwardly from the second side frame member 386. In like fashion, to snow guide members 472 and 474, the snow guide members 492 and 494 do not join each other. However, in this instance, the gap formed between the snow guide members 492 and 494 defines a station 498 for receiving a portion of the blower means 40.

Referring now to FIGS. 12, 16, 17, 19 and 20, the blower means 40 includes a blower housing 500, an impeller 502 disposed within and rotatively mounted to the blower housing 500 for drawing snow into the blower housing 500, a blower drive assembly 504 operatively connected to the impeller 502, and a discharge chute 506 connected to the blower housing 500 for ejecting snow away from the roof 22.

The blower housing 500 has a generally square lower portion 508 and an upper portion 510 which tapers from the lower portion 508 and extends upwardly at an angle to terminate in a finger-like projection 512. The lower portion 508 has defined therein a large, substantially circular, cavity or recess 514 that accommodates the impeller 502. At the juncture between the lower and upper portions 508 and 510, the cavity 510 is obstructed by a cover plate 516 that runs the entire length of the projection 512. In cooperation with the cover plate 516, the walls of the projection 512 define the discharge chute 506. An adjustable head 518 caps the discharge chute 506. The head 518 is attached to the projection 512 using a slot and pin arrangement. In this embodiment, the head 518 has slots 520 defined therein that receive pins 522 attached to the cover plate 516 and projection 512. The head 518 is constrained to move relative to the cover plate 516 and projection 512 along a path defined by the slots 520. This arrangement allows adjustment of the angle at which the snow is ejected from the head 518.

When mounted within the housing 378, the lower portion 508 of the blower housing 500 is retained within the station 498 formed between the third and fourth snow guide members 492 and 494 with its cavity 514 facing the front end 378 of the housing 38 (best shown in FIG. 17). The projection 512 extends through the top of the housing 38.

The impeller 502 has a drive shaft 524 with a first end (not shown) and an opposed second end 526. The first end is rotatably mounted to the blower drive assembly 504, while the second end 526 has fixed thereto a plurality of radially extending blades or paddle members 528 (in this embodiment, four paddles circumferentially spaced apart by 90° degrees).

As best shown in FIGS. 12 and 18, the blower drive assembly 504 is supported on the framework 410 and includes a drive motor 530, a gearbox 532 operatively connected to the drive motor 530 and a chain and sprocket arrangement (not shown) that is operable to transmit to the impeller drive shaft 524 the torque delivered by the gearbox 532. The chain and sprocket arrangement is disposed at least partially within a transmission housing 534 that extends between the arms 422 and 424 of the suspension arm 256.

In like fashion to drive motor 462, the drive motor 530 is preferably an electric motor. However, as with drive motor 462, other types of drive motors (i.e. pneumatic or hydraulic) may also be used, if desired, with the appropriate accommodations being made to take into account the extreme cold temperatures and weather conditions in which the drive motor will likely be operated.

Referring now to FIG. 16, the brush member 376 includes a longitudinal drive shaft 540 mounted for rotation between the side frame members 384 and 386 adjacent the rear end 380 of the housing 378. Carried on the drive shaft 540 at longitudinally and circumferentially spaced apart locations, is a plurality of brush heads 542. Each brush head 542 extends radially outward from the drive shaft 540 and includes a tuft of flexible bristles 544 captively retained by a bristle mount 546. Driving rotation of the shaft 540 is effected by the auger driving assembly 460, however, the direction of rotation is opposite to that of auger members 42 and 44. When the snow clearing assembly 36 is actuated, the rotation of the drive shaft 542 causes the ends of bristles 544 to bear against the roof 22 and flex to thereby sweep the remaining snow on the roof forwardly toward the blower means 40. In alternative embodiments, the brush member could be configured differently. For instance, the arrangement of the bush heads could be altered. Instead of having the brush heads disposed along the drive shaft in a number of rows (as shown in FIG. 16), it may be possible to arrange the brush heads in a helical fashion.

Optionally, to further enhance snow-clearing operations, a squeegee member in the nature of a strip of resilient material may be mounted to extend between the side frame members 384 and 386 at a location rearward of the brush member 376. For instance, such a squeegee member could be fixed to the first cross-member 402.

Figure 11:
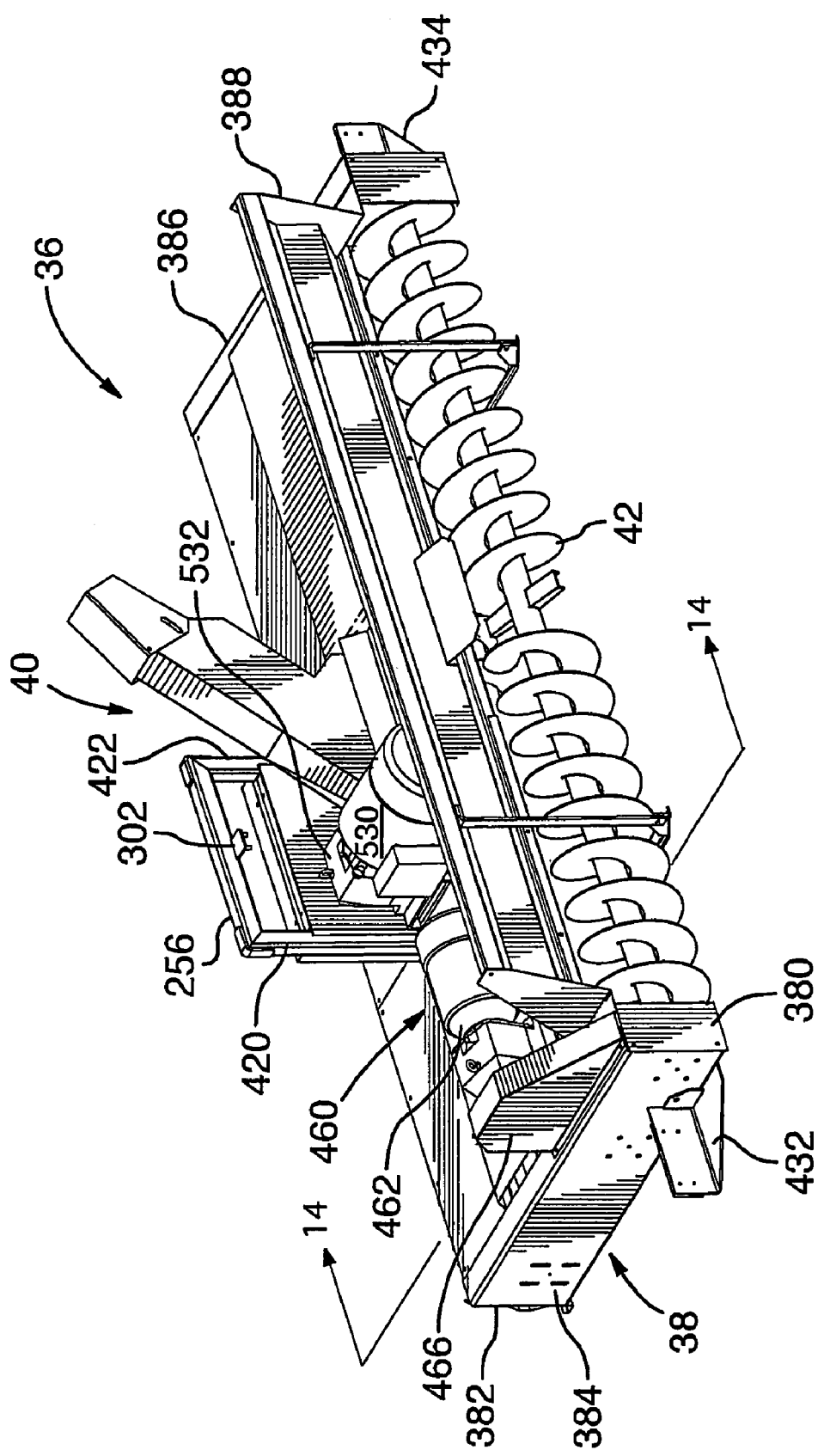
FIG. 11 is an isolated, top front right perspective view of the snow clearing assembly shown in FIG. 1.

As best shown in FIGS. 11, 15 and 16, the snow clearing assembly 36 is further provided with a pair of spaced apart, relatively thin, ski-like rail members 550 and 552 mounted to the underside of the housing 38 for abutting the roof 22 and for maintaining the gap G between the first auger member 42 and the roof 22. The rail members 550 and 552 extend longitudinally from the front end 380 to the rear end 382 of the housing 38. Each rail member 550, 552 is tied to the framework 410 at multiple locations—it attaches at its rear end 554 to cross-member 402 and at intermediate locations to each of the snow guide members 492, 472 (or 494 and 474 as the case may be). The front end 556 of each rail member 550, 552 is tied to the snow hood 388 by an arm 558, 560. The first rail member 550 is disposed adjacent the first side frame member 384, while the second rail member 552 is mounted adjacent the second side frame member 386. Each rail member 550, 552 is made of a wear-resistant material which is adapted to slide on the roof with minimal friction.

Turning now to the controller 46, it is housed in control panel 562 which is supported on a pedestal 564 located adjacent upright member 48a (best shown in FIG. 5). The controller 46 is operatively connected to each of the drive motors 322, 462 and 530, the photoelectric eyes 148 and 150, the suspension member position sensors 292 and 296, the upper and lower carriage displacement limit switches 352 and 354, the first and second sets 120 and 126 of signal lights. As described in greater detail below, it can receive signals from, and transmit signals to, these various components to control actuation of the signaling means 114, carriage drive assembly 34, the auger drive assembly 460 and the blower drive assembly 504.

Figure 21:
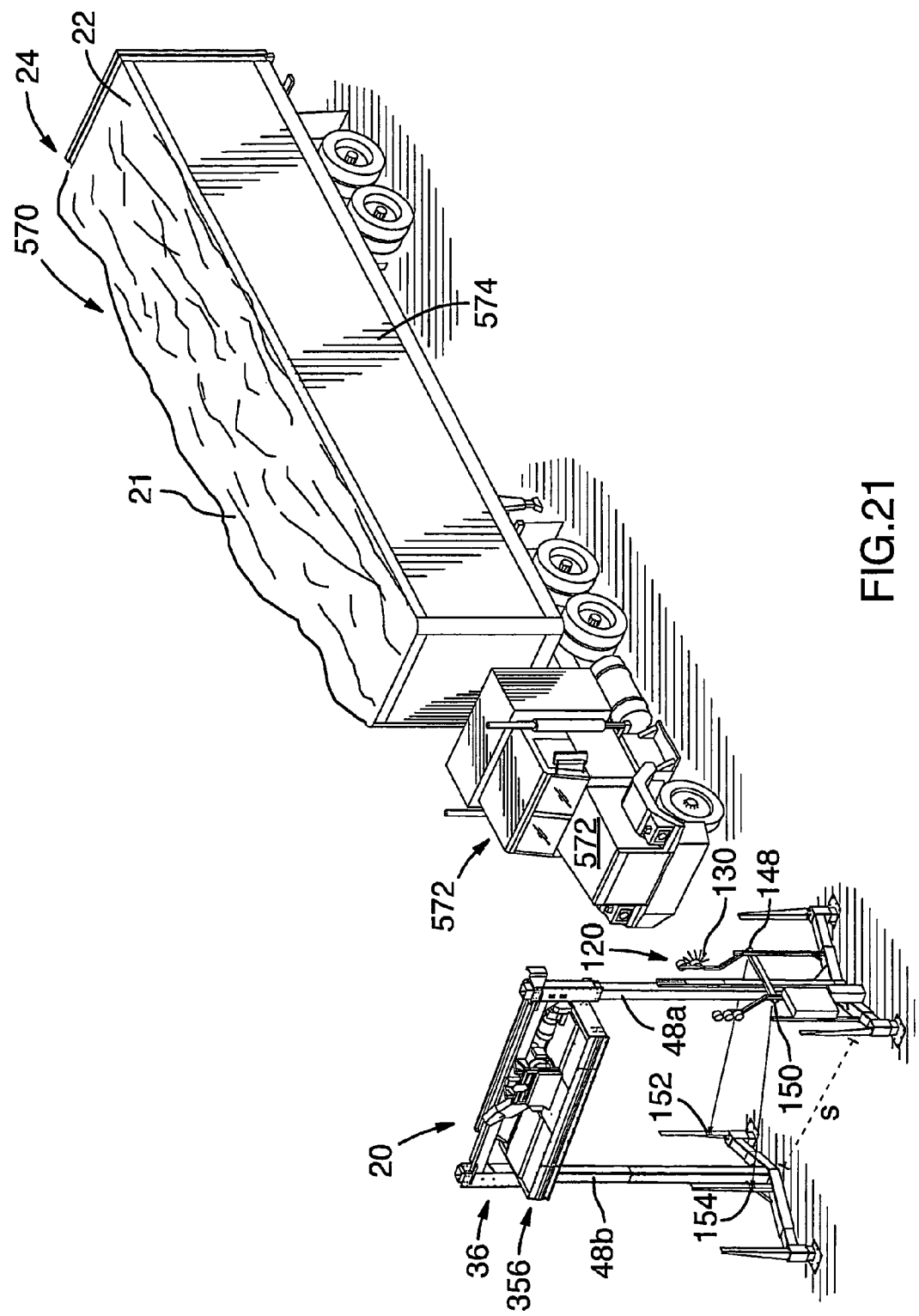
FIG. 21 is a rear right perspective view showing the vehicle snow clearing apparatus of FIG. 1 with a vehicle having an accumulation of snow on its roof positioned in front thereof and centered therewith.

An exemplary use of the vehicle snow clearing apparatus 20 to clear snow 21 from the roof 22 of a vehicle 24 in the nature of a tractor trailer 570, is now described with reference to FIGS. 21 to 29. Prior to deployment, care is taken to ensure the height of the tractor trailer 570 does not exceed the clearance height of the apparatus 20 and that there are no elements or components (i.e. open vents, exhaust stacks, antennas or the like) which protrude from the roof 22 of the tractor trailer 570 and which would likely interfere with the deployment of the snow clearing assembly 36. Following these preliminary safety checks, the driver positions the tractor trailer 570 in front of, and centered with, the apparatus 20 (as shown in FIG. 21). Prior to driving through the space S defined between the first and second upright members 48a and 48b, the driver of the tractor trailer 570 visually checks the first set 120 of signal lights to ascertain the operational status of the apparatus. The red STOP signal light 128 indicates that the apparatus 20 is non-operational. In contrast, when the green GO signal light 130 is illuminated it means that the apparatus 20 is ready and operational to perform the snow clearing operation. It will be noted that at this time the snow clearing assembly 36 will be carried at the first upper limit position 356.

Upon confirmation that the apparatus 20 is operation ready (i.e. the green GO signal light 130 is turned on), the driver slowly drives the tractor trailer 570 through the space S. As the nose of the cab portion 572 travels further between the upright members 28a and 28b, it breaks the light beam extending between the first photoelectric eye 138 and the reflector 150 (see FIG. 22). The controller 46 receives a first signal that the vehicle (in this case, the tractor trailer 570) has been detected by the first photoelectric eye 138. When the nose of the cab portion 572 advances past the second photoelectric eye 140 (see FIG. 23), the controller 46 receives a second signal indicating that the second photoelectric eye 140 has now detected the tractor trailer 572. At this time, the controller 46 registers that the light beam of the second photoelectric eye 140 has been interrupted for the first time.

As the tractor trailer 570 continues to advance through the space S, the driver monitors the first set 126 of signal lights to ensure that the status of apparatus remains operation ready. However, beyond the mast portion 48a, the first set 120 of signal lights will no longer be within view of the driver and as a result, the driver will be required to keep a close watch on the second set 126 of signal lights using his/her side view mirror. The driver will continue to drive through the apparatus so long as the second set 126 of signal lights shows the green GO signal light 136.

When the second photoelectric eye 140 is aligned with the gap defined between the cab portion 572 and the trailer portion 574 of the tractor trailer 570 (see FIG. 24), a light beam extends uninterrupted between the second photoelectric eye 140 and the reflector 152. The controller 46 receives a third signal that the light beam of the second photoelectric eye 140 has been restored and that the cab portion 572 of the tractor trailer 570 has now passed underneath the snow clearing assembly 36. In response to this signal, the controller 46 causes the second set 126 of signal lights to change from green GO signal light 136 to the yellow CAUTION signal light 134, thereby advising the driver that the tractor trailer 570 is nearly in position to initiate the cleaning cycle. At this time, the driver slows the vehicle's advance through the lifting frame 26.

Figure 25A:
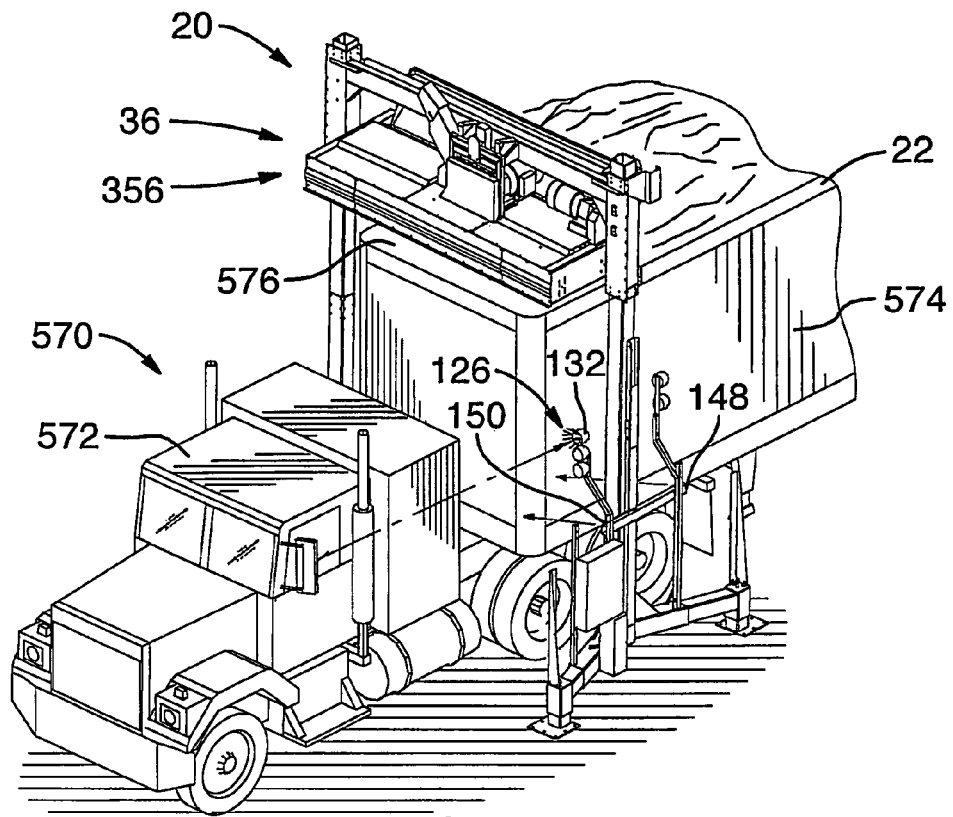
FIG. 25a is a rear right perspective view of the vehicle and the vehicle snow clearing apparatus illustrated in FIG. 22 showing the vehicle trailer portion extending beyond both the first and second optical sensors and the snow clearing assembly being carried at the first upper limit position.
Figure 25B:
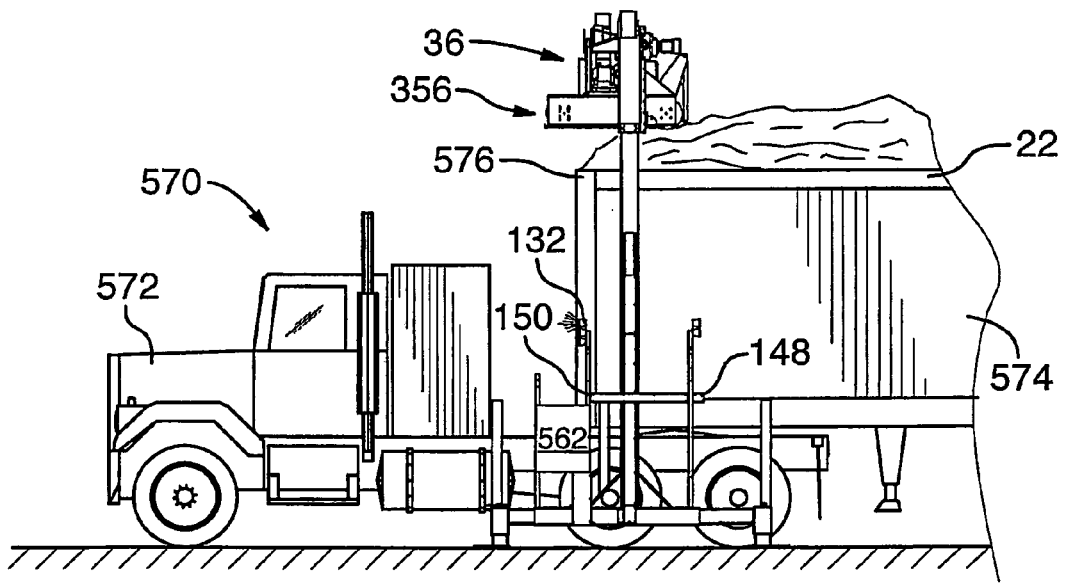

As shown in FIGS. 25a and 25b, at some point the tractor portion 574 of the tractor trailer 570 will obstruct both the first and the second photoelectric eyes 138 and 140, thereby breaking the light beams emitted from each. When this occurs, the controller 46 receives a fourth signal and registers that the light beam of the second photoelectric eye 140 has now been interrupted for a second time. The controller 46 actuates the second set 126 of signal lights to change from the yellow CAUTION signal light 134 to the red STOP signal light 132, thereby advising the driver to stop the vehicle as the snow clearing assembly 36 is now in position over the front edge 576 of the roof 22.

Figure 26:
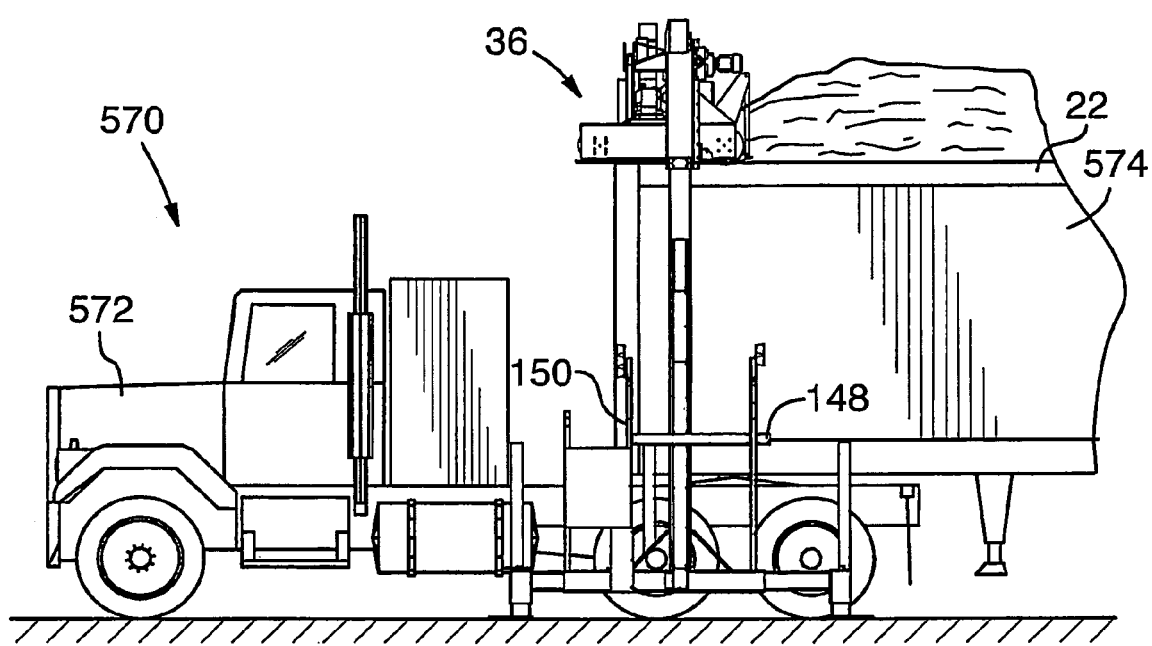
FIG. 26 is a side elevation view similar to that illustrated in FIG. 25b showing the snow clearing assembly in the in-use position.

Actuation of the cleaning cycle may be automated or may require the performance of one or more actions by the driver. In the automated mode, the controller 46 will automatically lower the snow clearing assembly 36 onto the roof 22 as shown in FIG. 26. In the driver actuated mode, the driver will be required to leave the vehicle and conduct a visual inspection of the position of the snow clearing assembly relative to the front edge 576 of the trailer portion 574, prior the carriage assembly 32 being lowered. Visual markings (not shown) affixed to the underside of the snow clearing assembly 36 may be used to assist the driver with his/her visual check. If upon inspection, the driver determines that the snow clearing assembly 36 is properly positioned, he/she will press a button (not shown) on the control panel 562 to power up the drive motor 322 and the carriage assembly 32 will be lowered onto the roof 22. The controller 46 will monitor movement of the carriage assembly 32 and will cut power to the drive motor 322 when it receives a signal from the position sensing means 290 that the contact pins 298 and 300 have been engaged by the tongue member 302 of the suspension arm 256.

Figure 27:
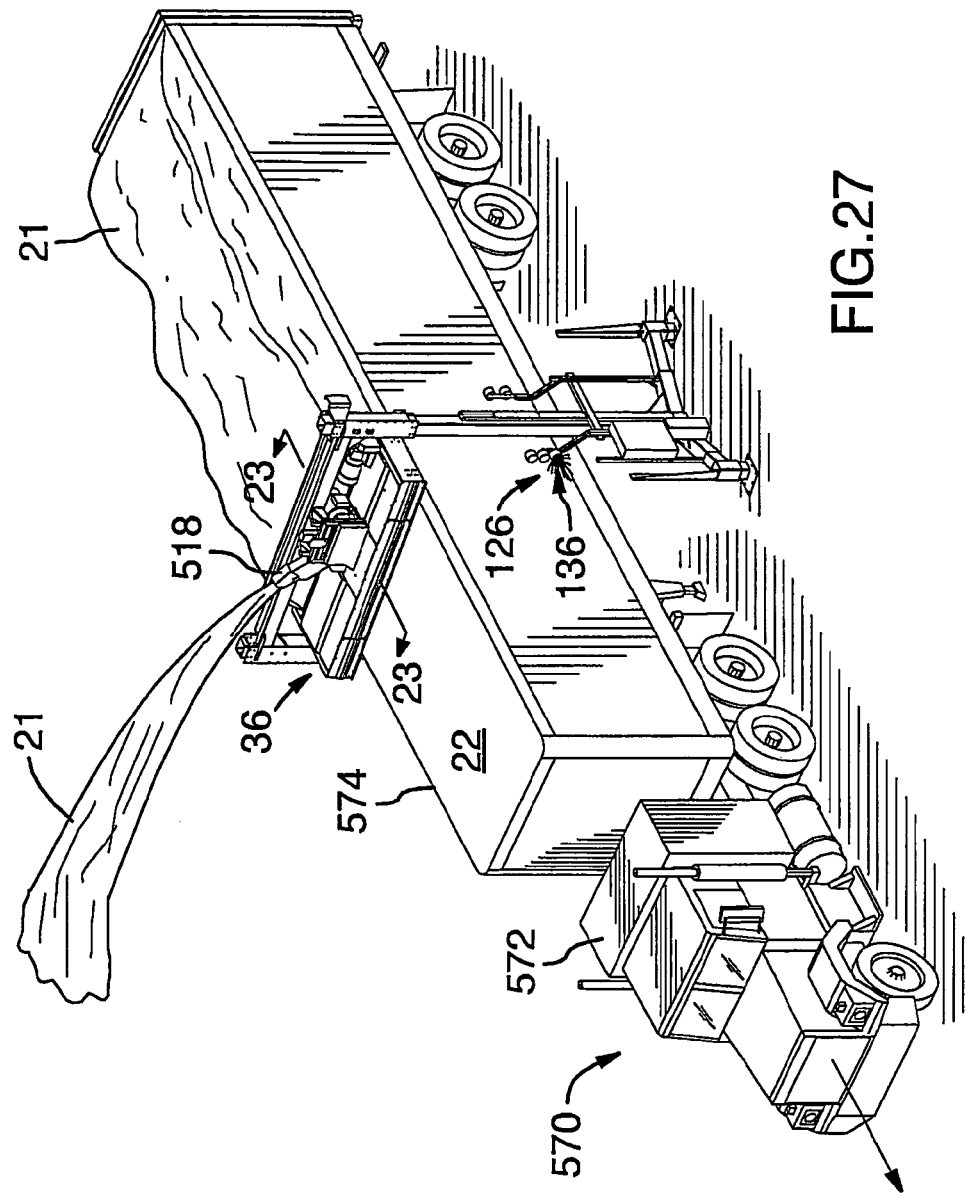
FIG. 27 is a rear right perspective view of the vehicle and the vehicle snow clearing apparatus illustrated in FIG. 22 showing the vehicle engaged within the vehicle snow clearing apparatus and the snow clearing assembly being deployed to clear snow from the roof of the vehicle.
Figure 28:
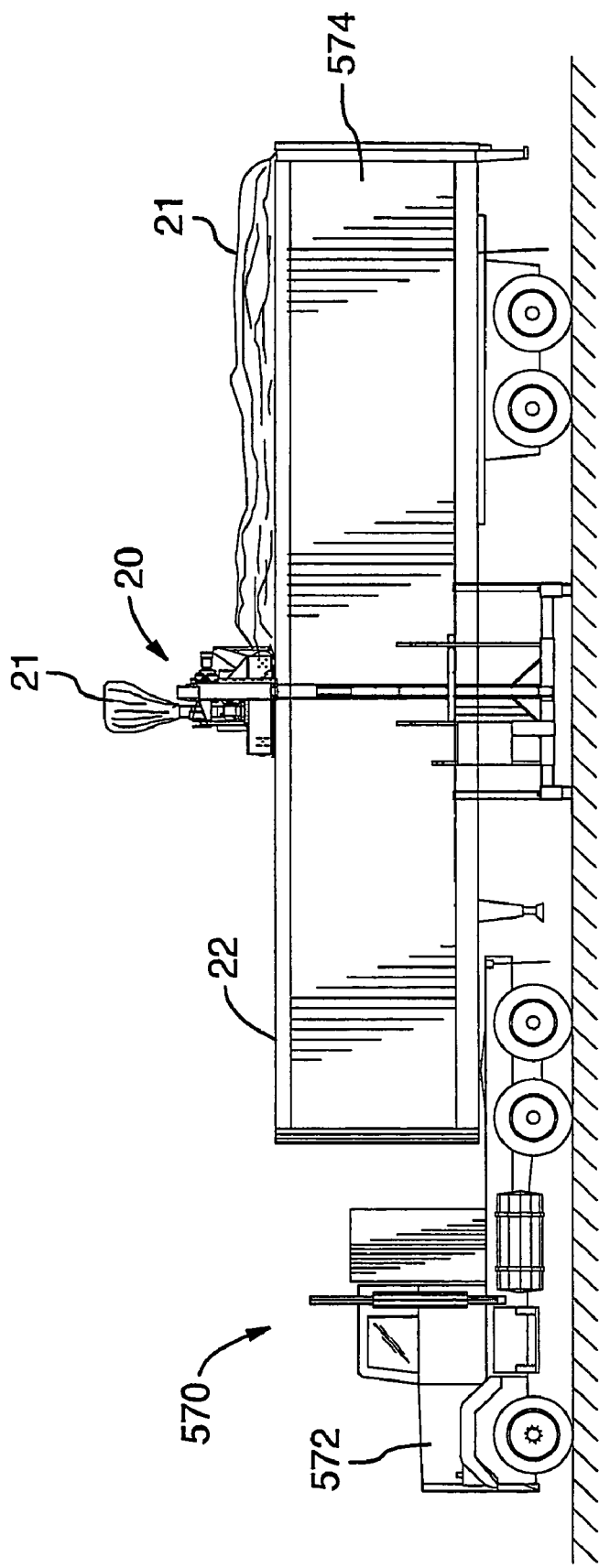
FIG. 28 is a side elevation of the vehicle and the vehicle snow clearing apparatus shown in FIG. 27.

With reference now to FIGS. 27 to 29, when the snow clearing assembly 35 is in the lowered position, the rail members 550 and 552 will be brought to bear against the roof 22 and the controller 46 will actuate the drive motors 462 and 530 and the second set 126 of signal lights. The red STOP signal light 132 will change to the green GO signal light 136 indicating to the driver that he/she can continue to drive through the apparatus 20.

Upon actuation of drive motor 462, the auger members 42 and 44 will be urged to rotate about their rotational axes $R_1$ and $R_2$ and will dig into the mounds of snow 21 on the roof 22. By virtue of its rigidity and strength, the first auger member 42 will break up the packed snow and/or ice 21, but will not directly make contact the roof 22 as a result of the gap G. The blade portions 446 and 448 of the first auger member 42 will convey the snow 21 adjacent the side frame members 384 and 386 along the snow guide members 472 and 474 directing it toward the centre of the auger member 42 whereat vane members 450 and 452 will push the snow 21 through the gap 476 toward the second auger member 44. The second auger member 44 engages the snow 21 in a manner generally similar to that of the first auger member 42, except that by virtue of its flexible helical portion 614 it is able to flex when urged to abut the roof 20 or a mound of snow 21 disposed thereon. The flexion of the flexible helical portion 614 and its engagement with the roof 22 will be effective to clear more snow 21 from the roof 22. The snow 21 will be conveyed toward the center of the second auger member 44 along the third and fourth snow guide members 492 and 494 and pushed into the impeller 502 of the blower means 40 by vane members 620 and 622 of the second auger member 44. From there, the snow 21 will pass through the blower housing 500 to be forcibly ejected from the head 518 of the discharge chute 506. The snow 21 ejected from the blower means 40 may be collected by a dump truck or other snow collection vehicle. The head 518 may be oriented accordingly to facilitate snow collection.

As the tractor trailer 570 moves through the apparatus 20, the snow clearing assembly 36 will clear the snow 21 on the roof 22 as described above. During the cleaning cycle, the driver keeps a close watch on the second set 126 of signal lights to make sure the operation is being carried out properly. If the speed of the vehicle is too great, the drive motors 462 and 530 will need to draw more current from the system. If a current higher than a predetermined limit is drawn, the controller 46 actuates the second set 126 of signal lights to turn on the yellow CAUTION signal light 134 advising the driver to slow down. Once the current falls behind the predetermined limit, the signal light will revert back to green GO signal light 136. In the event, the drive motors 462 and 530 exceed a predetermined load limit, the controller 46 will cut power to the motors and the signal light will turn to the red STOP signal light 132.

Depending on the extent of accumulation and the density of the snow and the length of the vehicle to be cleaned, a typical cleaning cycle may take between 45 seconds and 90 seconds. Once the cleaning cycle is completed and the tractor trailer 570 has pulled away from the lifting frame 26, the controller 46 will actuate the drive motor 322 to raise the snow clearing assembly 36 to the upper limit position 356. During the raising of the snow clearing assembly 36, the first set 120 of signal lights will display the red STOP signal light 128 to prevent another vehicle from entering the apparatus before it is operation ready.

In the present embodiment, the snow removal assembly 36 is configured for constrained upward and downward movement relative to the upright members 28a and 28b. To clear the snow from one end of the roof to the other, the vehicle 24 must be driven through the lifting frame 26. While this arrangement is generally preferred, for certain applications it may be desired to have the vehicle remain stationary during the cleaning cycle, while the snow removal assembly travels longitudinally along the roof to clear the snow.

While in the present embodiment the vehicle being cleaned is a tractor trailer, it must be appreciated that the vehicle snow clearing apparatus 20 may be used to clean the roofs of other vehicles to similar advantage, for instance, trucks, vans (i.e. cube vans) or cars. Additionally, the apparatus 20 tends to be well suited to clear snow from other motor vehicle surfaces, for example, from the top surface of flatbed trailers. In such cases, however, the snow clearing assembly 36 will be carried much lower on the lifting frame 26 than in the case of tractor trailers. Along the same vein, with appropriate modifications, a snow clearing assembly constructed in accordance with the principles of the present invention could be adapted to clear other surfaces upon which snow accumulates. For instance, it may be possible to suspend a modified snow clearing assembly from the front end of a vehicle to effect snow clearing operations for a roadway.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. An apparatus for clearing snow from the roof of a vehicle, the apparatus comprising:
    at least one upright member having a longitudinal axis;
    a lifting carriage assembly coupled to the at least one upright member for movement along the longitudinal axis thereof;
    a snow clearing assembly carried by the lifting carriage assembly and positionable on the roof of the vehicle, the snow clearing assembly including:
        a housing;
        blower means disposed at least partially within the housing for casting snow from the roof of the vehicle;
        a pair of first and second, spaced apart, auger members rotatably mounted within the housing for directing snow on the roof of the vehicle toward the blower means; the first auger member being disposed forward of the second auger member; the lowest extremity of the first auger member being spaced away from the roof, when the snow clearing assembly is positioned onto the roof of the vehicle; and at least one portion of the second auger member being constructed of a resilient material so as to allow the at least one portion of the second auger member to flex when borne against the roof during actuation of the snow clearing assembly.

2. The apparatus of claim 1 wherein the at least one upright member includes a pair of spaced apart first and second upright members, the spacing between the first and second upright members being sized so as to accommodate the passage of a vehicle therebetween.

3. The apparatus of claim 2 wherein each upright member has a mast portion and a pair of spaced apart, first and second feet connected to the mast portion for abutting a support surface.

4. The apparatus of claim 3 wherein the spacing between the first and second feet of each upright member is adjustable.

5. The apparatus of claim 4 wherein:
    each mast portion has a top end, a bottom end and first and second opposed hollow mounting arms carried on the bottom end; the hollow mounting arms extending away from each other generally transversely of the mast portion; and
    each foot has a portion configured for mating with one of the hollow mounting arms; the mating portion of each foot being telescopically mounted to one of the hollow mounting arms.

6. The apparatus of claim 2 further comprising:
    a carriage driving assembly operatively connected to the lifting carriage assembly for selectively moving the lifting carriage assembly along the longitudinal axes of the upright members; and
    a controller for governing actuation of the carriage driving assembly and snow clearing assembly.

7. The apparatus of claim 6 wherein the lifting carriage assembly is mounted to extend between the first and second upright members.

8. The apparatus of claim 6 wherein the lifting carriage assembly includes first and second carriage portions, each carriage portion being mounted onto one of the first and second upright members for longitudinal movement thereal-ong.

9. The apparatus of claim 8 wherein each carriage portion is mounted in surrounding relation to one of the first and second upright members.

10. The apparatus of claim 9 wherein the lifting carriage assembly further includes a cross-member having a first end attached to the first carriage portion and a second end attached to the second carriage portion.

11. The apparatus of claim 10 wherein:
    the snow clearing assembly is detachably mounted to the lifting carriage assembly; and
    the cross-member of the lifting carriage assembly has a cradle member attached thereto intermediate the first and second ends thereof for holding the snow clearing assembly suspended between the first and second upright members.

12. The apparatus of claim 11 wherein the housing has a suspension arm attached thereto engageable within the cradle member to allow suspension of the snow clearing assembly from the cradle member.

13. The apparatus of claim 12 further comprising sensing means associated with the cradle member for detecting the position of the suspension arm within the cradle.

14. The apparatus of claim 13 wherein the sensing means includes a first sensor operable to detect the suspension arm in a first lower position within the cradle member and a second sensor operable to detect the suspension arm in a second upper position within the cradle member.

15. The apparatus of claim 14 wherein the controller is operable to disable the carriage drive assembly when the second sensor detects the suspension arm in the second upper position.

16. The apparatus of claim 8 further comprising:
an upper displacement limit switch associated with one of the carriage portions and one of the upright members for detecting when the lifting carriage assembly has reached a first upper limit position on one of the upright members; and
a lower displacement limit switch associated with one of the carriage portions and one of the upright members for detecting when the lifting carriage assembly has reached a second lower limit position on one of the upright members;
the controller being operable to disable the carriage drive assembly when the lifting carriage assembly has reached one of the upper and lower limit positions.

17. The apparatus of claim 8 further comprising means for constraining movement of the snow clearing assembly relative to the lifting carriage assembly.

18. The apparatus of claim 17 wherein the constraining means includes first and second guide plates mounted to the housing, the first guide plate being engageable with the first carriage portion and the second guide plate being engageable with the second carriage portion.

19. The apparatus of claim 18 wherein:
the housing has a front end, a rear end, and a pair of spaced apart, first and second sidewalls extending between the front and rear ends of the housing;
the first guide plate is mounted to the first sidewall of the housing for bearing against a face of first carriage portion; and
the second guide plate is mounted to the second sidewall of the housing for bearing against a face of the second carriage portion.

20. The apparatus of claim 8 wherein each upright member includes a front face, an opposed rear face and a pair of spaced apart side faces, one of the faces of the upright member carrying thereon a longitudinally extending rack for engaging a portion of the carriage drive assembly.

21. The apparatus of claim 20 wherein the carriage drive assembly includes:
a drive shaft mounted for rotation between the first and second carriage portions, the drive shaft having a first end and a second end;
a drive motor for driving rotation of the drive shaft;
a first drive gear attached to the drive shaft adjacent the first end thereof; the first drive gear being associated with the first carriage portion and being mounted for engagement with the rack of the first upright member; and
a second drive gear attached to the drive shaft adjacent the second end thereof; the second drive gear being associated with the second carriage portion and being mounted for engagement with the rack of the second upright member.

22. The apparatus of claim 21 wherein each carriage portion includes a front face, an opposed rear face and a pair of spaced apart side faces for placement opposite the front, rear and side faces, respectively, of each respective upright member; the faces of each carriage portion cooperating with each other to define an opening shaped to receive therethrough one of the first and second upright members, the face of each carriage portion disposed opposite each rack having a protruding portion for accommodating the rack.

23. The apparatus of claim 22 wherein:
the front face of each carriage portion is disposed opposite each rack; and
the protruding portion in the front face of each carriage portion has a cutout defined therein to permit engagement of each respective drive gear to the rack of each respective upright member.

24. The apparatus of claim 1 further comprising signaling means associated with the apparatus and disposed within view of a driver seated within the vehicle.

25. The apparatus of claim 24 wherein the signaling means includes a first set of signal lights disposed frontward of the upright members.

26. The apparatus of claim 25 wherein the signaling means further includes a second set of signal lights disposed rearward of the upright members.

27. The apparatus of claim 1 further comprising a vehicle position sensing means for detecting the position of the vehicle relative to the apparatus.

28. The apparatus of claim 27 wherein the vehicle position sensing means including a first optical sensor carried forward of the longitudinal axes of the upright members and a second optical sensor carried rearward of the longitudinal axes of the upright members.

29. The apparatus of claim 1 further comprising:
a carriage driving assembly operatively connected to the lifting carriage assembly for selectively moving the lifting carriage assembly along the longitudinal axes of the upright members;
an auger drive assembly for driving rotation of the first and second auger members; and
a controller operable to actuate the carriage drive assembly, the blower means and the auger drive assembly.

30. The apparatus of claim 1 wherein the snow clearing assembly is detachably mounted to the lifting carriage assembly.

31. The apparatus of claim 1 wherein:
the housing has a front end, a rear end, and a pair of spaced apart, first and second sidewalls extending between the front and rear ends of the housing; and
the first and second auger members extend between the sidewalls of the housing and are mounted in tandem between the front and rear ends of the housing.

32. An apparatus for clearing snow from a surface to be cleared, the apparatus comprising:
at least one upright member, the at least one upright member having a longitudinal axis;
a lifting carriage assembly coupled to the at least one upright member for movement along the longitudinal axis thereof;
a carriage driving assembly operatively connected to the lifting carriage assembly and the lifting frame for selectively moving the lifting carriage assembly along the longitudinal axis of the at least one upright member; and
a snow clearing assembly carried by the lifting carriage assembly and positionable on the surface to be cleaned, the snow clearing assembly including:
a housing having a front end, a rear end, and a pair of spaced apart, first and second sidewalls extending between the front and rear ends of the housing;
blower means disposed at least partially within the housing for casting snow from the surface to be cleaned; and a pair of first and second, spaced apart, auger members rotatably mounted within the housing for directing snow on the surface to be cleaned toward the blower means; the first and second auger members extending between the sidewalls and mounted in tandem between the front and rear ends of the housing with the first auger member being disposed frontward of the second auger member; the lowest extremity of the first auger member being spaced away from the surface to be cleaned, when the snow clearing assembly is positioned onto the surface to be cleaned of the vehicle; at least one portion of the second auger member being constructed of a resilient material so as to allow the at least one portion of the second auger member to flex when borne against the surface to be cleaned during actuation of the snow clearing assembly.

33. A snow clearing assembly positionable on the roof of a vehicle, the snow clearing assembly comprising:
a housing;
blower means disposed at least partially within the housing for casting snow from the roof of the vehicle; and
a pair of first and second, spaced apart, auger members rotatably mounted within the housing for directing snow on the roof of the vehicle toward the blower means; the first auger member being disposed frontward of the second auger member; the first auger member having a first length, the second auger member having a second length, when the first length is projected rearwardly onto the second length the first length overlaps the second length over a majority portion thereof; the lowest extremity of the first auger member being spaced away from the roof, when the snow clearing assembly is positioned onto the roof of the vehicle; the first auger member being constructed of a rigid material; at least one portion of the second auger member being constructed of a resilient material so as to allow the at least one portion of the second auger member to flex when borne against the roof during actuation of the snow clearing assembly.

34. The assembly of claim 33 further comprising an auger drive assembly operatively connected to the first and second auger members.

35. The assembly of claim 34 wherein the auger drive assembly includes an electric drive motor for driving rotation of the first and second auger members.

36. The assembly of claim 33 wherein:
the roof of the vehicle has a width; and
each auger member has a length, the length of each auger member being at least as great as the width of the roof.

37. The assembly of claim 33 wherein at least one of the first and second auger members is a bidirectional auger member.

38. The assembly of claim 37 wherein the at least one bidirectional auger member includes a shaft having a first end, an opposed second end and first and second helical blade portions; the first helical blade portion extends inwardly from the first end with one of a right hand and left hand thread and the second helical blade portion extends inwardly from the second end with the other of a right hand and left hand thread.

39. The assembly of claim 38 wherein the at least one bidirectional auger member has a central gap defined between the first and second helical blade portions; in the region of the gap, the shaft having radially extending therefrom at least one snow paddle.

40. The assembly of claim 39 wherein the at least one snow paddle includes a first snow paddle and a second snow paddle, the first snow paddle being circumferentially spaced from the second snow paddle by 180° C. degrees.

41. The assembly of claim 33 wherein:
the first auger member has a first axis of rotation; and
the second auger member has a second axis of rotation;
the first axis of rotation being carried above the second axis of rotation.

42. The assembly of claim 33 wherein the blower means includes:
a blower housing;
an impeller disposed within the blower housing for drawing snow therein;
a drive motor operatively connected to the impeller for driving rotation thereof; and
a discharge chute connected to the blower housing for ejecting snow away from the top surface of the vehicle.

43. The assembly of claim 33 further comprising brush means carried on the snow clearing assembly.

44. The assembly of claim 43 wherein the brush means are disposed within the housing adjacent the rear end thereof.

45. The assembly of claim 44 wherein the brush means includes a brush member mounted for rotation between the first sidewall and the second sidewall of the housing.

46. The assembly of claim 44 wherein the blower means are disposed between the second auger member and the brush member.

47. The assembly of claim 44 further comprising an auger drive assembly operatively connected to the brush member and to each of the auger members for urging rotation thereof.

48. The assembly of claim 47 wherein the auger drive assembly is operable to rotate the first and second augers members in a first direction and the rotatable brush member in a second direction, the first direction being opposite the second direction.

49. The assembly of claim 33 wherein the snow clearing assembly includes means mounted to the underside of the housing for abutting the top surface of the vehicle and for spacing the first auger member from the top surface, when the snow clearing assembly is positioned onto the top surface.

50. The assembly of claim 48 wherein the spacing means includes a pair of spaced apart, first and second rail members extending between the front and rear ends of the housing; the first rail member being disposed adjacent the first sidewall of the housing and the second track member being disposed adjacent the second sidewall thereof.

51. The assembly of claim 33 wherein:
the housing has a front end, a rear end, and a pair of spaced apart, first and second sidewalls extending between the front and rear ends of the housing; and
the first and second auger members extend between the sidewalls of the housing and are mounted in tandem between the front and rear ends of the housing.

52. A snow clearing assembly positionable on a surface to be cleared, the snow clearing assembly comprising:
a housing having a front end, a rear end, and a pair of spaced apart, first and second sidewalls extending between the front and rear ends of the housing;
blower means disposed at least partially within the housing for casting snow from the surface to be cleaned;
a pair of first and second, spaced apart, auger members rotatably mounted within the housing for directing snow on the surface to be cleaned toward the blower means; the first and second auger members extending between the sidewalls and mounted in tandem between the front and rear ends of the housing with the first auger member being disposed frontward of the second auger member; the first auger member having a first length, the second auger member having a second length, when the first length is projected rearwardly onto the second length the first length overlaps the second length over a majority portion thereof; the lowest extremity of the first auger member being spaced away from the surface to be cleaned, when the snow clearing assembly is positioned onto the surface to be cleaned; the first auger being constructed of a rigid material; at least one portion of the second auger member being constructed of a resilient material so as to allow the at least one portion of the second auger member to flex when borne against the surface to be cleaned during actuation of the snow clearing assembly.

* * * * *